United States Patent
Lin et al.

(10) Patent No.: US 10,609,713 B2
(45) Date of Patent: Mar. 31, 2020

(54) METHODS TO INDICATE TIME DOMAIN RESOURCE ALLOCATION FOR PHYSICAL DOWNLINK SHARED CHANNEL BEFORE RRC CONNECTION

(71) Applicant: Telefonaktiebolaget LM Ericsson (publ), Stockholm (SE)

(72) Inventors: Zhipeng Lin, Nanjing (CN); Jingya Li, Göteborg (SE); Jianwei Zhang, Solna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 16/437,788

(22) Filed: Jun. 11, 2019

(65) Prior Publication Data

US 2019/0297629 A1 Sep. 26, 2019

Related U.S. Application Data

(63) Continuation of application No. PCT/IB2019/051632, filed on Feb. 28, 2019.

(Continued)

(51) Int. Cl.
*H04W 72/04* (2009.01)
*H04W 48/16* (2009.01)
(Continued)

(52) U.S. Cl.
CPC ....... *H04W 72/0493* (2013.01); *H04L 5/0044* (2013.01); *H04L 5/0053* (2013.01);
(Continued)

(58) Field of Classification Search
CPC ......... H04W 72/0493; H04W 72/0446; H04W 72/005; H04W 72/042; H04W 48/16;
(Continued)

(56) References Cited

U.S. PATENT DOCUMENTS

2015/0327046 A1* 11/2015 Lee ..................... H04W 56/002
370/338
2017/0367046 A1 12/2017 Papasakellariou
(Continued)

FOREIGN PATENT DOCUMENTS

WO 2016/127626 A1 8/2016

OTHER PUBLICATIONS

PCT Notification of Transmittal of The International Search Report and The Written Opinion of the International Searching Authority, or the Declaration for International Application No. PCT/IB2019/051632—dated Jun. 24, 2019.
(Continued)

*Primary Examiner* — Faisal Choudhury
(74) *Attorney, Agent, or Firm* — Baker Botts, LLP

(57) ABSTRACT

A method performed by a user equipment (UE) (110, 500, 800) is disclosed. The method comprises receiving (401), at the UE (110, 500, 800), an indication of a time domain resource allocation table to use for one or more Physical Downlink Shared Channel (PDSCH) transmissions. The method comprises determining (402), based on the received indication, the time domain resource allocation table to use for the one or more PDSCH transmissions.

30 Claims, 9 Drawing Sheets

Related U.S. Application Data

(60) Provisional application No. 62/636,545, filed on Feb. 28, 2018.

(51) Int. Cl.
*H04W 72/00* (2009.01)
*H04L 5/00* (2006.01)

(52) U.S. Cl.
CPC ........... *H04L 5/0094* (2013.01); *H04W 48/16* (2013.01); *H04W 72/005* (2013.01); *H04W 72/042* (2013.01); *H04W 72/0446* (2013.01); *H04L 5/0007* (2013.01)

(58) Field of Classification Search
CPC ..... H04L 5/007; H04L 5/0044; H04L 5/0053; H04L 5/0094
USPC ....................................................... 370/329
See application file for complete search history.

(56) References Cited

U.S. PATENT DOCUMENTS

| | | | |
|---|---|---|---|
| 2019/0150142 A1* | 5/2019 | Huang | H04W 72/1289 |
| 2019/0230689 A1* | 7/2019 | Cao | H04L 5/0007 |
| 2019/0261337 A1* | 8/2019 | Park | H04L 5/0007 |

OTHER PUBLICATIONS

PCT Written Opinion of The International Searching Authority for International Application No. PCT/IB2019/051632—dated Jun. 24, 2019.

3GPP TSG RAN WG1 Meeting #90bis; Prague, Czech Republic; Agenda Item: 7.3.1.2; Source: Huawei, HiSilicon; Title: CORESET configuration and search space design; R1-1717062—Oct. 9-13, 2017.

* cited by examiner

METHODS TO INDICATE TIME DOMAIN RESOURCE ALLOCATION FOR PHYSICAL DOWNLINK SHARED CHANNEL BEFORE RRC CONNECTION

PRIORITY

This application is a continuation, under 35 U.S.C. § 120 of International Patent Application Serial No. PCT/IB2019/051632 filed Feb. 28, 2019 and entitled "Methods to Indicate Time Domain Resource Allocation For Physical Downlink Shared Channel Before RRC Connection" which claims priority to U.S. Provisional Patent Application No. 62/636,545 filed Feb. 28, 2018 both of which are hereby incorporated by reference in their entirety.

TECHNICAL FIELD

The present disclosure relates, in general, to wireless communications and, more particularly, to methods to indicate time domain resource allocation for Physical Downlink Shared Channel (PDSCH) transmissions.

BACKGROUND

In order to connect to a network, a wireless device (e.g., a user equipment (UE)) needs to acquire network synchronization and obtain essential system information, including system information in the Master Information Block (MIB) and Remaining Minimum System Information (RMSI). Synchronization signals are used for adjusting the frequency of the device relative to the network. Synchronization signals are also used for finding the proper timing of the received signal from the network. In New Radio (NR), the synchronization and access procedure may involve several signals, including the Primary Synchronization Signal (PSS), Secondary Synchronization Signal (SSS), Physical Broadcast Channel (PBCH), and Synchronization Signal and PBCH Block (SSB or SS/PBCH block).

The PSS allows for network detection in the presence of a high initial frequency error (up to tens of ppm). The SSS allows for more accurate frequency adjustments and channel estimation while at the same time providing fundamental network information (e.g., cell ID).

The PBCH provides a subset of the minimum system information for random access and configurations for fetching the remaining minimum system information in RMSI. The PBCH also provides timing information within a cell (e.g., to separate timing between beams transmitted from a cell). The amount of information that can be fit into the PBCH is highly limited to keep the size down. Furthermore, demodulation reference signals (DMRS) are interleaved with PBCH resources to allow it to be received properly.

The SSB includes the above signals (i.e., PSS, SSS and PBCH DMRS) and PBCH. The SSB may have different subcarrier spacing (SCS) (e.g., 15 kilohertz (kHz), 30 kHz, 120 kHz or 240 kHz) depending on the frequency range.

In NR, RMSI is carried in PDSCH scheduled by the Physical Downlink Control Channel (PDCCH) in the Control Resource Set (CORESET) configured by PBCH. The RMSI contains the remaining subset of minimum system information (e.g., the bit map of the SSBs that are actually transmitted).

A number of SSBs (typically rather close in time) constitute an SS burst set. An SS burst set is transmitted periodically. The periodicity is configured in RMSI. For initial access, a 20 millisecond (ms) SS burst set periodicity is assumed. FIGS. 1 and 2 below illustrate the SSB mapping within slots and SS burst set mapping to slots within 5 ms, respectively.

FIG. 1 illustrates an example of SSB symbols in slots. More particularly, FIG. 1 illustrates the SSB mapping for different SCS (including 15 kHz, 30 kHz (Pattern 1), 30 kHz (Pattern 2), 120 kHz, and 240 kHz). For the 15 kHz, 30 kHz (Pattern 1), 30 kHz (Pattern 2), and 120 kHz SCS, the SSB mapping within two slots (Slot n and Slot n+1) is shown. As illustrated in FIG. 1, each slot contains 14 Orthogonal Frequency Division Multiplexing (OFDM) symbols (depicted as boxes numbered 0-13). For the 240 kHz SCS, the SSB mapping within 4 slots (Slot n, Slot n+1, Slot n+2, and Slot n+3) is shown. For the 240 kHz SCS example, each slot contains 14 OFDM symbols (depicted as boxes numbered 0-13).

In the example of FIG. 1, the OFDM symbols in brackets are mapped to a candidate SSB position. Each candidate SSB position includes 4 OFDM symbols. For instance, for the example of 15 kHz SCS, Slot n includes two candidate SSB positions: a first that includes OFDM symbols 2-5; and a second that includes OFDM symbols 8-11. Slot n+1 also includes two candidate SSB positions: a first that includes OFDM symbols 2-5; and a second that includes OFDM symbols 8-11. The mapping for the 30 kHz (Pattern 2) SCS is the same as that for the 15 kHz SCS.

For the example of 30 kHz (Pattern 1) SCS, Slot n includes two candidate SSB positions: a first that includes OFDM symbols 4-7; and a second that includes OFDM symbols 8-11. Slot n+1 also includes two candidate SSB positions: a first that includes OFDM symbols 2-5; and a second that includes OFDM symbols 6-9. The mapping for the 120 kHz SCS is the same as that for the 30 kHz (Pattern 1) SCS.

For the example of the 240 kHz SCS, some of the candidate SSB positions extend across the slots. For example, Slot n includes a first candidate SSB position including OFDM symbols 8-11. A second candidate SSB position extends across Slot n and Slot n+1, including OFDM symbols 12-13 of Slot n and OFDM symbols 0-1 of Slot n+1. Slot n+1 further includes a third candidate SSB position including OFDM symbols 2-5 and a fourth candidate SSB position including OFDM symbols 6-9. Similarly, Slot n+2 includes a first candidate SSB position that includes OFDM symbols 4-7 and a second candidate SSB position that includes OFDM symbols 8-11. A third candidate SSB position extends across Slot n+2 and Slot n+3, including OFDM symbols 12-13 of Slot n+2 and OFDM symbols 0-1 of Slot n+3. Slot n+3 further includes a fourth candidate SSB position that includes OFDM symbols 2-5 and a fifth candidate SSB position that includes OFDM symbols 6-9.

FIG. 2 illustrates an example of SS burst sets in slots within 5 ms. More particularly, FIG. 2 illustrates an example of SS burst sets in a half radio frame of 5 ms. In the example of FIG. 2, each box is a slot. As shown in FIG. 2, an SS burst set is mapped to slots within a 5 ms window in a compact manner with a mapping pattern, resulting in high network energy efficiency. The position of possible SSB locations in a slot is illustrated in FIG. 1 and, as described above, the position of possible SSB locations depends on the SCS. The mapping patterns of SSB have a periodicity of 2 slots (for SSB with SCS value 15 kHz, 30 kHz or 120 kHz) and 4 slots (for SSB with SCS value 240 kHz). And with this periodicity of 2 or 4 slots, SSB mapping can be continued via repeating the pattern until the maximum number of SSBs are fully mapped.

Before Radio Resource Control (RRC) connection, there are access messages and system information that need to be transmitted to a wireless device on PDSCH. These messages and information can be, for example, RMSI, other system information (OSI), paging, Random Access Response (RAR) (message 2) and message 4, etc. Existing approaches to time domain resource allocation for messages and system information that need to be transmitted on PDSCH before RRC connection suffer from certain deficiencies. For example, existing approaches may lack flexibility in terms of the time domain resource allocation table that can be used. Thus, there is a need for a time resource indication mechanism for transmitting and receiving PDSCH carrying information and/or messages before RRC connection.

SUMMARY

To address the foregoing problems with existing solutions, disclosed is a method performed by a UE. The method comprises receiving, at the UE, an indication of a time domain resource allocation table to use for one or more PDSCH transmissions. The method comprises determining, based on the received indication, the time domain resource allocation table to use for the one or more PDSCH transmissions.

In certain embodiments, the UE may not be in an RRC connected mode.

In certain embodiments, the received indication may be included in a System Information Block (SIB). In certain embodiments, the SIB may be a System Information Block Type 1 (SIB1). In certain embodiments, the received indication may comprise a PDSCH time resource allocation parameter. In certain embodiments, the received indication may comprise one or more bits.

In certain embodiments, the received indication may comprise a CORESET configuration. In certain embodiments, the time domain resource allocation table to use for the one or more PDSCH transmissions may be configured in RMSI, and the method may further comprise determining to use the time domain resource allocation table configured in RMSI when the CORESET configuration is configured in RMSI. In certain embodiments, the time domain resource allocation table to use for the one or more PDSCH transmissions may be a time domain resource allocation table for RMSI, and the method may further comprise determining to use the time domain resource allocation table for RMSI when the CORESET configuration is configured in PBCH.

In certain embodiments, the time domain resource allocation table to use for the one or more PDSCH transmissions may be a default time domain resource allocation table defined for all PDSCH transmissions before RRC connection.

In certain embodiments, the time domain resource allocation table to use for the one or more PDSCH transmissions may be one of a plurality of time domain resource allocation tables. In certain embodiments, the plurality of time domain resource allocation tables may comprise a plurality of different default time domain resource allocation tables defined for PDSCH transmissions before RRC connection. In certain embodiments, a first time domain resource allocation table of the plurality of time domain resource allocation tables may comprise a default time domain resource allocation table configured for PDSCH carrying RMSI, and a second time domain resource allocation table of the plurality of time domain resource allocation tables may comprise a default time domain resource allocation table configured for PDSCH carrying messages other than RMSI.

In certain embodiments, the one or more PDSCH transmissions may comprise one or more of: RMSI; OSI, a paging message; a random access message 2; and a random access message 4.

In certain embodiments, the method may further comprise determining a time resource allocation for the one or more PDSCH transmissions using the determined time domain resource allocation table.

In certain embodiments, the time domain resource allocation table to use for the one or more PDSCH transmissions may comprise one or more of: a row index; a DMRS position; a PDSCH mapping type; a slot level offset; a starting OFDM symbol in a slot; and a number of OFDM symbols allocated for the one or more PDSCH transmissions.

Also disclosed is a UE. The UE comprises a receiver, a transmitter, and processing circuitry coupled to the receiver and the transmitter. The processing circuitry is configured to receive, at the UE, an indication of a time domain resource allocation table to use for one or more PDSCH transmissions. The processing circuitry is configured to determine, based on the received indication, the time domain resource allocation table to use for the one or more PDSCH transmissions.

Also disclosed is a computer program, the computer program comprising instructions configured to perform the above-described method in a UE.

Also disclosed is a computer program product, the computer program product comprising a non-transitory computer-readable storage medium, the non-transitory computer-readable storage medium comprising a computer program comprising computer-executable instructions which, when executed on a processor, are configured to perform the above-described method in a UE.

Also disclosed is a method performed by a network node. The method comprises determining a time domain resource allocation table to use for one or more PDSCH transmissions. The method comprises transmitting, to a UE, an indication of the time domain resource allocation table to use for the one or more PDSCH transmissions.

In certain embodiments, the UE may not be in an RRC connected mode.

In certain embodiments, the indication may be included in a SIB. In certain embodiments, the SIB may be a SIB1. In certain embodiments, the indication may comprise a PDSCH time resource allocation parameter. In certain embodiments, the indication may comprise one or more bits.

In certain embodiments, the indication may comprise a CORESET configuration. In certain embodiments, the time domain resource allocation table to use for the one or more PDSCH transmissions may be configured in RMSI, and the indication may instruct the UE to use the time domain resource allocation table configured in RMSI when the CORESET configuration is configured in RMSI. In certain embodiments, the time domain resource allocation table to use for the one or more PDSCH transmissions may be a time domain resource allocation table for RMSI, and the indication may instruct the UE to use the time domain resource allocation table for RMSI when the CORESET configuration is configured in PBCH.

In certain embodiments, the time domain resource allocation table to use for the one or more PDSCH transmissions may be a default time domain resource allocation table defined for all PDSCH transmissions before RRC connection.

In certain embodiments, the time domain resource allocation table to use for the one or more PDSCH transmissions may be one of a plurality of time domain resource allocation tables. In certain embodiments, the plurality of time domain resource allocation tables may comprise a plurality of different default time domain resource allocation tables defined for PDSCH transmissions before RRC connection. In certain embodiments, a first time domain resource allocation table of the plurality of time domain resource allocation tables may comprise a default time domain resource allocation table configured for PDSCH carrying RMSI, and a second time domain resource allocation table of the plurality of time domain resource allocation tables may comprise a default time domain resource allocation table configured for PDSCH carrying messages other than RMSI.

In certain embodiments, the one or more PDSCH transmissions may comprise one or more of: RMSI; OSI; a paging message; a random access message 2; and a random access message 4.

In certain embodiments, the method may further comprise determining a time resource allocation for the one or more PDSCH transmissions.

In certain embodiments, the time domain resource allocation table to use for the one or more PDSCH transmissions may comprise one or more of: a row index; a demodulation reference signal position; a PDSCH mapping type; a slot level offset; a starting OFDM symbol in a slot; and a number of OFDM symbols allocated for the one or more PDSCH transmissions.

Also disclosed is a network node. The network node comprises a receiver, a transmitter, and processing circuitry coupled to the receiver and the transmitter. The processing circuitry is configured to determine a time domain resource allocation table to use for one or more PDSCH transmissions. The processing circuitry is configured to transmit, to a UE, an indication of the time domain resource allocation table to use for the one or more PDSCH transmissions.

Also disclosed is a computer program, the computer program comprising instructions configured to perform the above-described method in a network node.

Also disclosed is a computer program product, the computer program product comprising a non-transitory computer-readable storage medium, the non-transitory computer-readable storage medium comprising a computer program comprising computer-executable instructions which, when executed on a processor, are configured to perform the above-described method in a network node.

Certain embodiments of the present disclosure may provide one or more technical advantages. For example, certain embodiments enable the time domain resource allocation table to be indicated, such as for PDSCH carrying messages before RRC connection. This may advantageously permit different time domain resource allocation tables to be defined, which may advantageously support flexibility and different configurations for PDSCHs carrying messages other than RMSI, for example before RRC connection. Other advantages may be readily apparent to one having skill in the art. Certain embodiments may have none, some, or all of the recited advantages.

BRIEF DESCRIPTION OF THE DRAWINGS

For a more complete understanding of the disclosed embodiments and their features and advantages, reference is now made to the following description, taken in conjunction with the accompanying drawings, in which.

DETAILED DESCRIPTION

Figure 1:
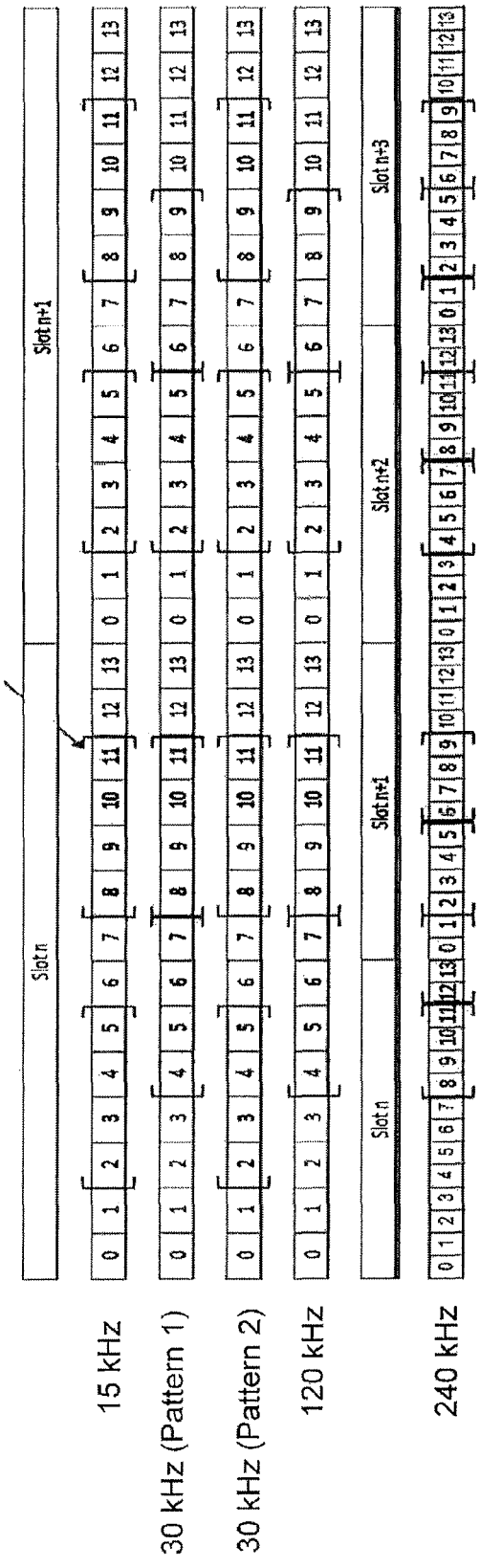
FIG. 1 illustrates an example of SSB symbols in slots.
Figure 2:
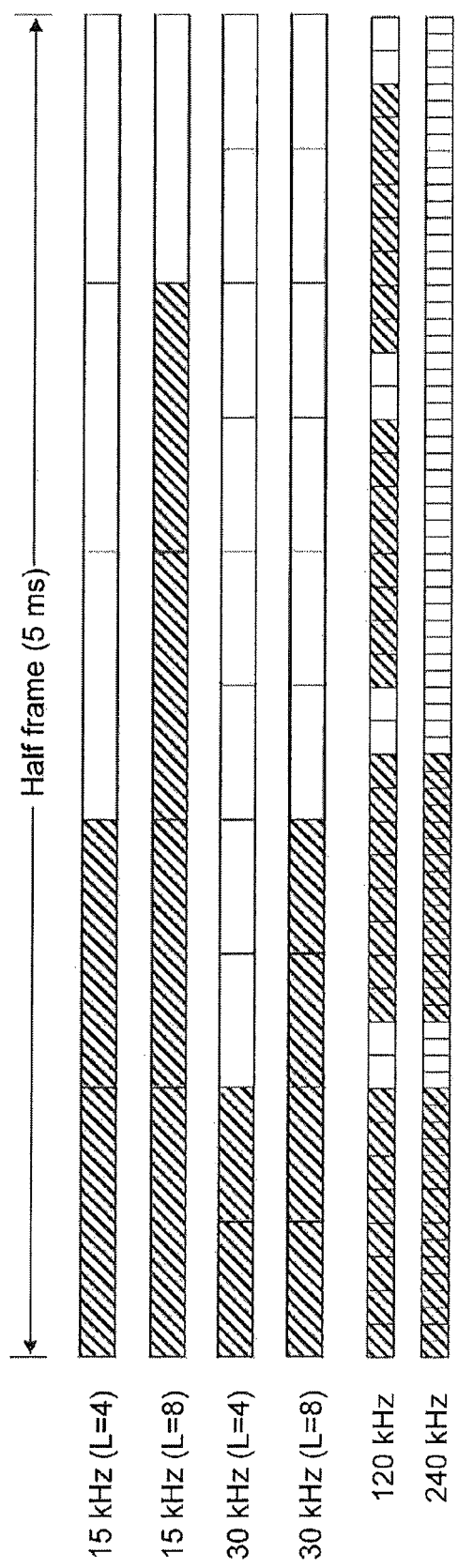
FIG. 2 illustrates an example of SS burst sets in slots within 5 ms.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

Currently, time domain allocation of PDSCH (and Physical Uplink Shared Channel (PUSCH)) in NR has not been finalized in RAN1. Some agreements, however, have been made. For example, it was agreed that for RRC connected mode, a time domain resource allocation table with 16 rows is signaled, by RRC signaling, to a UE per bandwidth part (BWP). Then, an index in the scheduling Downlink Control Information (DCI) will indicate the exact time resource allocation for PDSCH.

It was further agreed that for both slot and mini-slot, the scheduling DCI can provide an index into a UE-specific table giving the OFDM symbols used for the PDSCH (or PUSCH) transmission, including the starting OFDM symbol and length in OFDM symbols of the allocation. A number of items were indicated for further study, including: one or more tables; including the slots used in the case of multi-slot/multi-mini-slot scheduling or slot index for cross-slot scheduling; and the effect of slot format indicator (SFI) support for non-contiguous allocations. At least for RMSI scheduling, it was agreed that at least one table entry needs to be fixed in the spec.

As described above, there are access messages and system information that also need to be transmitted to the wireless device on PDSCH before RRC connection. These messages and information can be, for example, RMSI, OSI, paging, RAR (message 2) and message 4, etc. Existing approaches to time domain resource allocation for messages and system information that need to be transmitted on PDSCH before RRC connection suffer from certain deficiencies. For example, existing approaches may lack flexibility in terms of the time domain resource allocation table that can be used. Thus, there is a need for a time resource indication mechanism for transmitting and receiving. PDSCH carrying information/messages, for example before RRC connection.

The present disclosure contemplates various embodiments that may address these and other deficiencies of existing approaches. In particular, the present disclosure contemplates various embodiments that may be applicable to time domain resource allocation for PDSCH carrying messages (such as those described above) that need to be transmitted before RRC connection. In certain embodiments, a default time domain resource allocation table may be specified for at least RMSI. For PDSCH carrying a message other than RMSI before RRC configuration, the corresponding time domain allocation table may be the same table as that for RMSI, or it may be a different table.

In certain embodiments, more than one time domain resource allocation table may be configured for PDSCH time domain resource allocation before RRC connection. The present disclosure contemplates various embodiments through which the time domain resource allocation table to use for PDSCH transmissions can be determined, for example according to one or more predefined rules and/or using an indication communicated to a wireless device (e.g., a UE), for example via RMSI/SIB1 or PBCH.

According to one example embodiment, a method in a UE is disclosed. The UE receives an indication of a time domain resource allocation table to use for one or more PDSCH transmissions. The UE determines, based on the received indication, the time domain resource allocation table to use for the one or more PDSCH transmissions.

In certain embodiments, the UE may not be in RRC connected mode when it receives the indication. In certain embodiments, the received indication may be included in a SIB. In certain embodiments, the SIB may be a System Information Block Type 1 (SIB1). In certain embodiments, the received indication may comprise a PDSCH time resource allocation parameter. In certain embodiments, the received indication may comprise one or more bits.

According to another example embodiment, a method performed by a network node is disclosed. The network node determines a time domain resource allocation table to use for one or more PDSCH transmissions. The network node transmits, to a UE, an indication of the time domain resource allocation table to use for the one or more PDSCH transmissions.

In certain embodiments, the UE may not be in RRC connected mode. In certain embodiments, the indication may be included in a SIB. In certain embodiments, the SIB may be a SIB1. In certain embodiments, the indication may comprise a PDSCH time resource allocation parameter. In certain embodiments, the indication may comprise one or more bits.

Certain embodiments may provide one or more technical advantages. For example, certain embodiments enable the time domain resource allocation table for one or more PDSCH transmissions to be indicated to a wireless device, such as for one or more PDSCH transmissions carrying messages before RRC connection. This may advantageously permit different time domain resource allocation tables to be defined, which may support flexibility and different configurations for PDSCHs carrying messages other than RMSI before RRC connection. Other advantages may be readily apparent to one having skill in the art.

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

Figure 3:
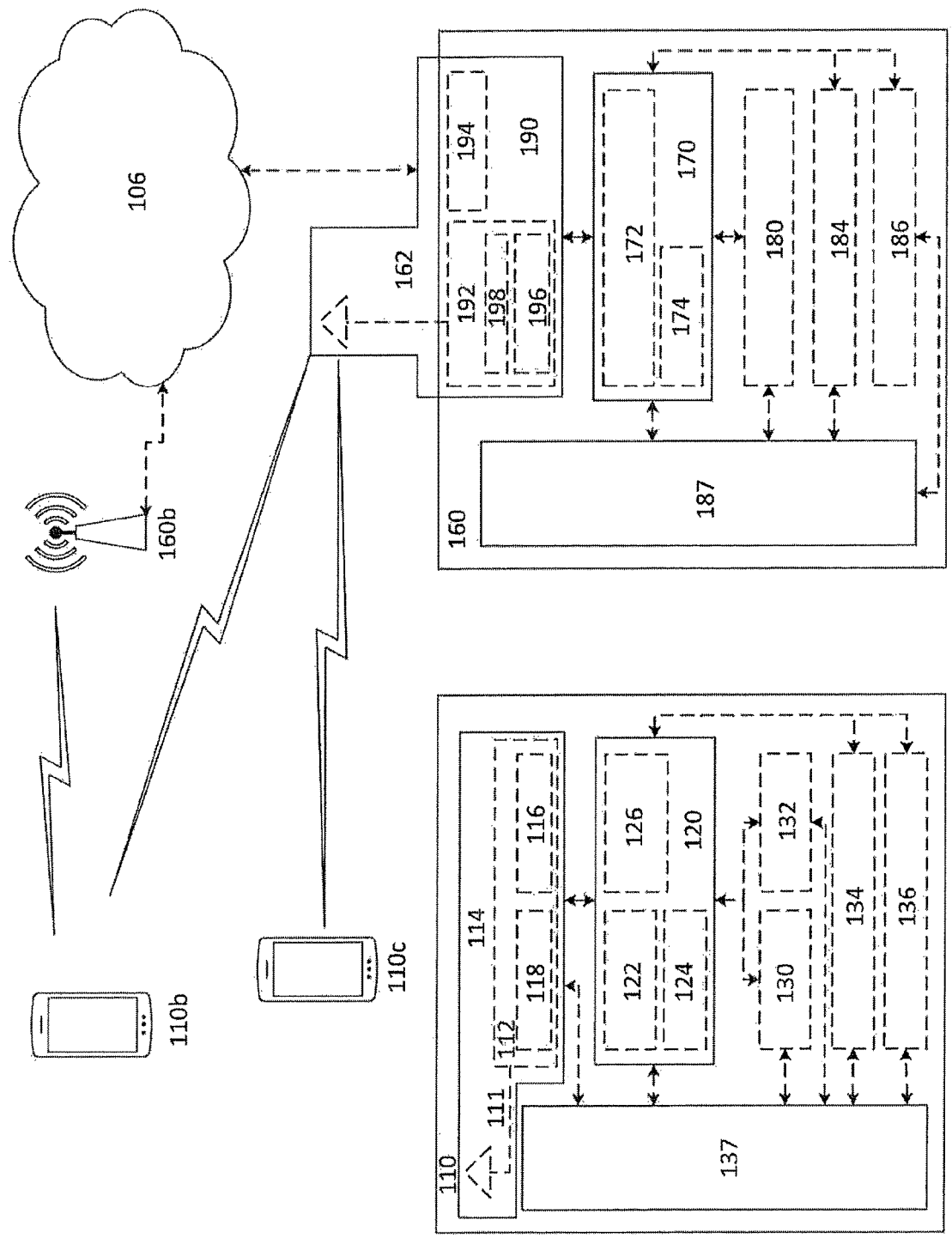
FIG. 3 illustrates an example wireless communications network, in accordance with certain embodiments.

FIG. 3 illustrates an example wireless communications network, in accordance with certain embodiments. Although the subject matter described herein may be implemented in any appropriate type of system using any suitable components, the embodiments disclosed herein are described in relation to a wireless network, such as the example wireless network illustrated in FIG. 3. For simplicity, the wireless network of FIG. 3 only depicts network 106, network nodes 160 and 160b, and wireless devices 110, 110b, and 110c. In practice, a wireless network may further include any additional elements suitable to support communication between wireless devices or between a wireless device and another communication device, such as a landline telephone, a service provider, or any other network node or end device. Of the illustrated components, network node 160 and wireless device 110 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 106 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 160 and wireless device 110 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 3, network node 160 includes processing circuitry 170, device readable medium 180, interface 190, auxiliary equipment 184, power source 186, power circuitry 187, and antenna 162. Although network node 160 illustrated in the example wireless network of FIG. 3 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node 160 are depicted as single boxes located within a larger box, or nested within multiple boxes, in practice, a network node may comprise multiple different physical components that make up a single illustrated component (e.g., device readable medium 180 may comprise multiple separate hard drives as well as multiple RAM modules).

Similarly, network node 160 may be composed of multiple physically separate components (e.g., a NodeB component and a RNC component, or a BTS component and a BSC component, etc.), which may each have their own respective components. In certain scenarios in which network node 160 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node 160 may be configured to support multiple radio access technologies (RATs). In such embodiments, some components may be duplicated (e.g., separate device readable medium 180 for the different RATs) and some components may be reused (e.g., the same antenna 162 may be shared by the RATs). Network node 160 may also include multiple sets of the various illustrated components for different wireless technologies integrated into network node 160, such as, for example, GSM, WCDMA, LTE, NR, WiFi, or Bluetooth wireless technologies. These wireless technologies may be integrated into the same or different chip or set of chips and other components within network node 160.

Processing circuitry 170 is configured to perform any determining, calculating, or similar operations (e.g., certain obtaining operations) described herein as being provided by a network node. These operations performed by processing circuitry 170 may include processing information obtained by processing circuitry 170 by, for example, converting the obtained information into other information, comparing the obtained information or converted information to information stored in the network node, and/or performing one or more operations based on the obtained information or converted information, and as a result of said processing making a determination.

Processing circuitry 170 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 160 components, such as device readable medium 180, network node 160 functionality. For example, processing circuitry 170 may execute instructions stored in device readable medium 180 or in memory within processing circuitry 170. Such functionality may include providing any of the various wireless features, functions, or benefits discussed herein. In some embodiments, processing circuitry 170 may include a system on a chip (SOC).

In some embodiments, processing circuitry 170 may include one or more of radio frequency (RF) transceiver circuitry 172 and baseband processing circuitry 174. In some embodiments, radio frequency (RF) transceiver circuitry 172 and baseband processing circuitry 174 may be on separate chips (or sets of chips), boards, or units, such as radio units and digital units. In alternative embodiments, part or all of RF transceiver circuitry 172 and baseband processing circuitry 174 may be on the same chip or set of chips, boards, or units In certain embodiments, some or all of the functionality described herein as being provided by a network node, base station, eNB or other such network device may be performed by processing circuitry 170 executing instructions stored on device readable medium 180 or memory within processing circuitry 170. In alternative embodiments, some or all of the functionality may be provided by processing circuitry 170 without executing instructions stored on a separate or discrete device readable medium, such as in a hard-wired manner. In any of those embodiments, whether executing instructions stored on a device readable storage medium or not, processing circuitry 170 can be configured to perform the described functionality. The benefits provided by such functionality are not limited to processing circuitry 170 alone or to other components of network node 160, but are enjoyed by network node 160 as a whole, and/or by end users and the wireless network generally.

Device readable medium 180 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 170. Device readable medium 180 may store any suitable instructions, data or information, including a computer program, software, an application including one or more of logic, rules, code, tables, etc. and/or other instructions capable of being executed by processing circuitry 170 and, utilized by network node 160. Device readable medium 180 may be used to store any calculations made by processing circuitry 170 and/or any data received via interface 190. In some embodiments, processing circuitry 170 and device readable medium 180 may be considered to be integrated.

Interface 190 is used in the wired or wireless communication of signalling and/or data between network node 160, network 106, and/or wireless devices 110. As illustrated, interface 190 comprises port(s)/terminal(s) 194 to send and receive data, for example to and from network 106 over a wired connection. Interface 190 also includes radio front end circuitry 192 that may be coupled to, or in certain embodiments a part of, antenna 162. Radio front end circuitry 192 comprises filters 198 and amplifiers 196. Radio front end circuitry 192 may be connected to antenna 162 and processing circuitry 170. Radio front end circuitry may be configured to condition signals communicated between antenna 162 and processing circuitry 170. Radio front end circuitry 192 may receive digital data that is to be sent out to other network nodes or wireless devices via a wireless connection. Radio front end circuitry 192 may convert the digital data into a radio signal having the appropriate channel and bandwidth parameters using a combination of filters 198 and/or amplifiers 196. The radio signal may then be transmitted via antenna 162. Similarly, when receiving data, antenna 162 may collect radio signals which are then converted into digital data by radio front end circuitry 192. The digital data may be passed to processing circuitry 170. In other embodiments, the interface may comprise different components and/or different combinations of components.

In certain alternative embodiments, network node 160 may not include separate radio front end circuitry 192, instead, processing circuitry 170 may comprise radio front end circuitry and may be connected to antenna 162 without separate radio front end circuitry 192. Similarly, in some embodiments, all or some of RF transceiver circuitry 172 may be considered a part of interface 190. In still other embodiments, interface 190 may include one or more ports or terminals 194, radio front end circuitry 192, and RF transceiver circuitry 172, as part of a radio unit (not shown), and interface 190 may communicate with baseband processing circuitry 174, which is part of a digital unit (not shown).

Antenna 162 may include one or more antennas, or antenna arrays, configured to send and/or receive wireless signals. Antenna 162 may be coupled to radio front end circuitry 190 and may be any type of antenna capable of transmitting and receiving data and/or signals wirelessly. In some embodiments, antenna 162 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna 162 may be separate from network node 160 and may be connectable to network node 160 through an interface or port.

Antenna 162, interface 190, and/or processing circuitry 170 may be configured to perform any receiving operations and/or certain obtaining operations described herein as being performed by a network node. Any information, data and/or signals may be received from a wireless device, another network node and/or any other network equipment. Similarly, antenna 162, interface 190, and/or processing circuitry 170 may be configured to perform any transmitting operations described herein as being performed by a network node. Any information, data and/or signals may be transmitted to a wireless device, another network node and/or any other network equipment.

Power circuitry 187 may comprise, or be coupled to, power management circuitry and is configured to supply the components of network node 160 with power for performing the functionality described herein. Power circuitry 187 may receive power from power source 186. Power source 186 and/or power circuitry 187 may be configured to provide power to the various components of network node 160 in a form suitable for the respective components (e.g., at a voltage and current level needed for each respective component). Power source 186 may either be included in, or external to, power circuitry 187 and/or network node 160. For example, network node 160 may be connectable to an external power source (e.g., an electricity outlet) via an input circuitry or interface such as an electrical cable, whereby the external power source supplies power to power circuitry 187. As a further example, power source 186 may comprise a source of power in the form of a battery or battery pack which is connected to, or integrated in, power circuitry 187. The battery may provide backup power should the external power source fail. Other types of power sources, such as photovoltaic devices, may also be used.

Alternative embodiments of network node 160 may include additional components beyond those shown in FIG. 3 that may be responsible for providing certain aspects of the network node's functionality, including any of the functionality described herein and/or any functionality necessary to support the subject matter described herein. For example, network node 160 may include user interface equipment to allow input of information into network node 160 and to allow output of information from network node 160. This may allow a user to perform diagnostic, maintenance, repair, and other administrative functions for network node 160.

As used herein, wireless device refers to a device capable, configured, arranged and/or operable to communicate wirelessly with network nodes and/or other wireless devices. Unless otherwise noted, the term wireless device may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a wireless device may be configured to transmit and/or receive information without direct human interaction. For instance, a wireless device may be designed to transmit information to a network on a predetermined schedule, when triggered by an internal or external event, or in response to requests from the network. Examples of a wireless device include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). a vehicle-mounted wireless terminal device, etc. A wireless device may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a wireless device may represent a machine or other device that performs monitoring and/or measurements, and transmits the results of such monitoring and/or measurements to another wireless device and/or a network node. The wireless device may in this case be a machine-to-machine (M2M) device, which may in a 3GPP context be referred to as an MTC device. As one particular example, the wireless device may be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a wireless device may represent a vehicle or other equipment that is capable of monitoring and/or reporting on its operational status or other functions associated with its operation. A wireless device as described above may represent the endpoint of a wireless connection, in which case the device may be referred to as a wireless terminal. Furthermore, a wireless device as described above may be mobile, in which case it may also be referred to as a mobile device or a mobile terminal.

As illustrated, wireless device 110 includes antenna 111, interface 114, processing circuitry 120, device readable medium 130, user interface equipment 132, auxiliary equipment 134, power source 136 and power circuitry 137. Wireless device 110 may include multiple sets of one or more of the illustrated components for different wireless technologies supported by wireless device 110, such as, for example, GSM, WCDMA, LTE, NR, WiFi, WiMAX, or Bluetooth wireless technologies, just to mention a few. These wireless technologies may be integrated into the same or different chips or set of chips as other components within wireless device 110.

Antenna 111 may include one or more antennas or antenna arrays, configured to send and/or receive wireless signals, and is connected to interface 114. In certain alternative embodiments, antenna 111 may be separate from wireless device 110 and be connectable to wireless device 110 through an interface or port. Antenna 111, interface 114, and/or processing circuitry 120 may be configured to perform any receiving or transmitting operations described herein as being performed by a wireless device. Any information, data and/or signals may be received from a network node and/or another wireless device. In some embodiments, radio front end circuitry and/or antenna 111 may be considered an interface.

As illustrated, interface 114 comprises radio front end circuitry 112 and antenna 111. Radio front end circuitry 112 comprise one or more filters 118 and amplifiers 116. Radio front end circuitry 114 is connected to antenna 111 and processing circuitry 120, and is configured to condition signals communicated between antenna 111 and processing circuitry 120. Radio front end circuitry 112 may be coupled to or a part of antenna 111. In some embodiments, wireless device 110 may not include separate radio front end circuitry 112; rather, processing circuitry 120 may comprise radio front end circuitry and may be connected to antenna 111. Similarly, in some embodiments, some or all of RF transceiver circuitry 122 may be considered a part of interface 114. Radio front end circuitry 112 may receive digital data that is to be sent out to other network nodes or wireless devices via a wireless connection. Radio front end circuitry 112 may convert the digital data into a radio signal having the appropriate channel and bandwidth parameters using a combination of filters 118 and/or amplifiers 116. The radio signal may then be transmitted via antenna 111. Similarly, when receiving data, antenna 111 may collect radio signals which are then converted into digital data by radio front end circuitry 112. The digital data may be passed to processing circuitry 120. In other embodiments, the interface may comprise different components and/or different combinations of components.

Processing circuitry 120 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other wireless device 110 components, such as device readable medium 130, wireless device 110 functionality. Such functionality may include providing any of the various wireless features or benefits discussed herein. For example, processing circuitry 120 may execute instructions stored in device readable medium 130 or in memory within processing circuitry 120 to provide the functionality disclosed herein.

As illustrated, processing circuitry 120 includes one or more of RE transceiver circuitry 122, baseband processing circuitry 124, and application processing circuitry 126. In other embodiments, the processing circuitry may comprise different components and/or different combinations of components. In certain embodiments processing circuitry 120 of wireless device 110 may comprise a SOC. In some embodiments, RE transceiver circuitry 122, baseband processing circuitry 124, and application processing circuitry 126 may be on separate chips or sets of chips. In alternative embodiments, part or all of baseband processing circuitry 124 and application processing circuitry 126 may be combined into one chip or set of chips, and RE transceiver circuitry 122 may be on a separate chip or set of chips. In still alternative embodiments, part or all of RF transceiver circuitry 122 and baseband processing circuitry 124 may be on the same chip or set of chips, and application processing circuitry 126 may be on a separate chip or set of chips. In yet other alternative embodiments, part or all of RF transceiver circuitry 122, baseband processing circuitry 124, and application processing circuitry 126 may be combined in the same chip or set of chips. In some embodiments, RF transceiver circuitry 122 may be a part of interface 114. RF transceiver circuitry 122 may condition RF signals for processing circuitry 120.

In certain embodiments, some or all of the functionality described herein as being performed by a wireless device may be provided by processing circuitry 120 executing instructions stored on device readable medium 130, which in certain embodiments may be a computer-readable storage medium. In alternative embodiments, some or all of the functionality may be provided by processing circuitry 120 without executing instructions stored on a separate or discrete device readable storage medium, such as in a hard-wired manner. In any of those particular embodiments, whether executing instructions stored on a device readable storage medium or not, processing circuitry 120 can be configured to perform the described functionality. The benefits provided by such functionality are not limited to processing circuitry 120 alone or to other components of wireless device 110, but are enjoyed by wireless device 110 as a whole, and/or by end users and the wireless network generally.

Processing circuitry 120 may be configured to perform any determining, calculating, or similar operations (e.g., certain obtaining operations) described herein as being performed by a wireless device. These operations, as performed by processing circuitry 120, may include processing information obtained by processing circuitry 120 by, for example, converting the obtained information into other information, comparing the obtained information or converted information to information stored by wireless device 110, and/or performing one or more operations based on the obtained information or converted information, and as a result of said processing making a determination.

Device readable medium 130 may be operable to store a computer program, software, an application including one or more of logic, rules, code, tables, etc. and/or other instructions capable of being executed by processing circuitry 120. Device readable medium 130 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry 120. In some embodiments, processing circuitry 120 and device readable medium 130 may be considered to be integrated.

User interface equipment 132 may provide components that allow for a human user to interact with wireless device 110. Such interaction may be of many forms, such as visual, audial, tactile, etc. User interface equipment 132 may be operable to produce output to the user and to allow the user to provide input to wireless device 110. The type of interaction may vary depending on the type of user interface equipment 132 installed in wireless device 110. For example, if wireless device 110 is a smart phone, the interaction may be via a touch screen; if wireless device 110 is a smart meter, the interaction may be through a screen that provides usage (e.g., the number of gallons used) or a speaker that provides an audible alert (e.g., if smoke is detected). User interface equipment 132 may include input interfaces, devices and circuits, and output interfaces, devices and circuits. User interface equipment 132 is configured to allow input of information into wireless device 110, and is connected to processing circuitry 120 to allow processing circuitry 120 to process the input information. User interface equipment 132 may include, for example, a microphone, a proximity or other sensor, keys/buttons, a touch display, one or more cameras, a USB port, or other input circuitry. User interface equipment 132 is also configured to allow output of information from wireless device 110, and to allow processing circuitry 120 to output information from wireless device 110. User interface equipment 132 may include, for example, a speaker, a display, vibrating circuitry, a USB port, a headphone interface, or other output circuitry. Using one or more input and output interfaces, devices, and circuits, of user interface equipment 132, wireless device 110 may communicate with end users and/or the wireless network, and allow them to benefit from the functionality described herein.

Auxiliary equipment 134 is operable to provide more specific functionality which may not be generally performed by wireless devices. This may comprise specialized sensors for doing measurements for various purposes, interfaces for additional types of communication such as wired communications etc. The inclusion and type of components of auxiliary equipment 134 may vary depending on the embodiment and/or scenario.

Power source 136 may, in some embodiments, be in the form of a battery or battery pack. Other types of power sources, such as an external power source (e.g., an electricity outlet), photovoltaic devices or power cells, may also be used. Wireless device 110 may further comprise power circuitry 137 for delivering power from power source 136 to the various parts of wireless device 110 which need power from power source 136 to carry out any functionality described or indicated herein. Power circuitry 137 may in certain embodiments comprise power management circuitry. Power circuitry 137 may additionally or alternatively be operable to receive power from an external power source; in which case wireless device 110 may be connectable to the external power source (such as an electricity outlet) via input circuitry or an interface such as an electrical power cable. Power circuitry 137 may also in certain embodiments be operable to deliver power from an external power source to power source 136. This may be, for example, for the charging of power source 136. Power circuitry 137 may perform any formatting, converting, or other modification to the power from power source 136 to make the power suitable for the respective components of wireless device 110 to which power is supplied.

As described above, there are access messages and system information (e.g., RMSI, OSI, paging, RAR (message 2), and message 4, etc.) that need to be transmitted on PDSCH before RRC connection. Existing approaches to time domain resource allocation for the messages and system information that need to be transmitted on PDSCH before RRC connection suffer from certain deficiencies. For example, existing approaches may lack flexibility in terms of the time domain resource allocation table that can be used.

The present disclosure contemplates various embodiments related to a time resource indication mechanism for transmitting and receiving PDSCH carrying information and/or messages before RRC connection. Although certain embodiments describe definitions and/or signalling for the time domain allocation table for PDSCH carrying messages before RRC connection, it should be understood that the present disclosure is not limited to these example embodiments. For example, the various embodiments described herein may also be applicable to scenarios in which wireless device 110 has already established an RRC connection (e.g, when wireless device 110 is in an RRC connected mode).

In certain embodiments, network node 160 may determine a time domain resource allocation for one or more PDSCH transmissions (e.g., one or more PDSCH transmissions such as access messages and system information, including one or more of RMSI, OSI, paging, RAR/MSG2, message 4, and any other suitable PDSCH transmission.). Additionally, network node 160 may determine a time domain resource allocation table to use for the one or more PDSCH transmissions.

In certain embodiments, network node 160 transmits, to wireless device 110, an indication of the time domain resource allocation table to use for the one or more PDSCH transmissions. Wireless device 110 receives the indication of the time domain resource allocation table to use for the one or more PDSCH transmissions and determines, based on the received indication, the time domain resource allocation table to use for the one or more PDSCH transmissions. In certain embodiments, wireless device 110 may not be in RRC connected mode. Thus, wireless device 110 may receive the indication before wireless device 110 has established an RRC connection.

In certain embodiments, the indication of the time domain resource allocation table to use for the one or more PDSCH transmissions received by wireless device 110 may be included in a SIB, for example SIB1. In some cases, the received indication may be a PDSCH time resource allocation parameter. For example, in certain embodiments a PDSCH time resource allocation parameter may be introduced in RMSI/SIB1 for PDSCH messages before RRC connection. As one example, in certain embodiments the parameter below may be introduced in PDCCH-Config-Common in SIB as well as during handover and Primary Secondary Cell (PSCell)/Secondary Cell (SCell) addition:

pdsch-AllocationList-Common SEQUENCE (SIZE(1 . . . maxNrofDL-Allocations)) OF PDSCH-TimeDomain-ResourceAllocation In such an implementation, the definition of PDSCH-TimeDomainResourceAllocation can be the same or similar to the definition specified in PDCCH-Config (as described in 3GPP TS 38.331 V15.0.1). Note that the example parameter above is just one possible example of how the PDSCH time resource allocation parameter may be introduced in RMSI/SIB1. Other implementations are possible. For example, in certain embodiments the parameters pdsch-TimeDomainAllocationList may be introduced in the PDSCH-ConfigCommon information element in SIB1. In such a scenario, the pdsch-TimeDomainAllocationList field may be a list of time-domain configuration for timing of downlink assignment to downlink data. The configuration may apply for PDCCH scrambled for CORESET #0 for which the default values in 3GPP TS 38.214, table 5.1.2.1.1-1 apply.

As noted above, the various embodiments described herein are not limited to scenarios before RRC connection. For example, in certain embodiments wireless device 110 may receive the indication of the time domain resource allocation table to use for the one or more PDSCH transmissions while in RRC connected mode. In such a scenario, wireless device 110 may use the indication (e.g., the PDSCH time resource allocation parameter pdsch-TimeDomainAllocationList in SIB1) when wireless device 110 has not received a specific pdsch-TimeDomainAllocationList in dedicated RRC signaling.

In certain embodiments, one common default time domain resource allocation table may be defined for all PDSCHs before RRC connection. Thus, in certain embodiments the time domain resource allocation table to use for the one or more PDSCH transmissions may be a default time domain resource allocation table defined for all PDSCH transmissions before RRC connection.

In certain embodiments, the time domain resource allocation table to use for the one or more PDSCH transmissions may be one of a plurality of time domain resource allocation tables. In some cases, the plurality of time domain resource allocation tables may comprise a plurality of different default time domain resource allocation tables defined for PDSCH transmissions before RRC connection. For example, in certain embodiments two default different time domain resource allocation tables (e.g., Table A and Table B) may be defined for PDSCH before RRC connection. One default time domain resource allocation table (e.g., Table A) may be configured for PDSCH carrying RMSI, and the other time domain resource allocation table (e.g., Table B) may be defined for PDSCH carrying messages other than RMSI before RRC connection.

In certain embodiments, the received indication may comprise one or more bits. For example, one bit may be introduced in RMSI to indicate which time allocation table to use for PDSCH carrying messages before RRC connection. In one example implementation, when this bit is set to 0, it indicates that Table A is used (i.e., use the same table as RMSI); otherwise, Table B is used.

As described above, in certain embodiments a default time domain resource allocation table may be configured for PDSCH carrying RMSI. In certain embodiments, in addition to the default time domain resource allocation table for PDSCH carrying RMSI, one or more additional time domain resource allocation tables (e.g., Table B and Table C) may be defined for PDSCH carrying messages other than RMSI before RRC connection. In such a scenario, more bits can be introduced in RMSI to indicate which time domain resource allocation table to use for PDSCH carrying messages before RRC connection. In some cases, RRC signaling may be used to overwrite the signaling in RMSI after RRC connection.

In certain embodiments, the indication received by wireless device 110 may be the CORESET configuration. Thus, in certain embodiments the time domain resource allocation table(s) for non-RMSI PDSCHs before RRC configuration may depend on the corresponding CORESET configuration. For example, if the CORESET is configured in RMSI, then wireless device 110 may use the time domain resource allocation table configured/signaled in RMSI. If, however, the CORESET is configured in PBCH, wireless device 110 may use the time domain resource allocation table for RMSI. Note that in some cases multiple time domain resource allocation tables can be used. In such a scenario, some signaling can be added in RMSI to provide an indication of which of the multiple time domain resource allocation tables to use.

In certain embodiments, wireless device 110 may determine a time resource allocation for the one or more PDSCH transmissions using the determined time domain resource allocation table. The time domain resource allocation table to use for the one or more PDSCH transmissions may include any suitable information. For example, in certain embodiments the time domain resource allocation table to use for the one or more PDSCH transmissions may include one or more of: a row index; a DMRS position; a PDSCH mapping type; a slot level offset; a starting OFDM symbol in a slot; and a number of OFDM symbols allocated for the one or more PDSCH transmissions.

Table 1 below is an example of a time domain resource allocation table that may be used for the one or more PDSCH transmissions. More particularly, Table 1 is an example of a default PDSCH time domain resource allocation A for normal cyclic prefix (CP). Table 1 below includes a PDSCH mapping type. In the example of Table 1, Type A PDSCH mapping type is a normal slot allocation type, and Type B PDSCH mapping is a mini-slot allocation type. The "dmrs-TypeA-Position" provides the OFDM symbol index of the first DMRS (for demodulation of the PDSCH) OFDM symbol. $K_0$ is a slot level offset related to the slot where the CORESET is. S is the starting OFDM symbol in a slot. L is the number of OFDM symbols allocated for PDSCH.

TABLE 1

| Row index | dmrs-TypeA-Position | PDSCH mapping type | $K_0$ | S | L |
|---|---|---|---|---|---|
| 1 | 2 | Type A | 0 | 2 | 12 |
|   | 3 | Type A | 0 | 3 | 11 |

TABLE 1-continued

| Row index | dmrs-TypeA-Position | PDSCH mapping type | $K_0$ | S | L |
|---|---|---|---|---|---|
| 2 | 2 | Type A | 0 | 2 | 10 |
|   | 3 | Type A | 0 | 3 | 9 |
| 3 | 2 | Type A | 0 | 2 | 9 |
|   | 3 | Type A | 0 | 3 | 8 |
| 4 | 2 | Type A | 0 | 2 | 7 |
|   | 3 | Type A | 0 | 3 | 6 |
| 5 | 2 | Type A | 0 | 2 | 5 |
|   | 3 | Type A | 0 | 3 | 4 |
| 6 | 2 | Type B | 0 | 9 | 4 |
|   | 3 | Type B | 0 | 10 | 4 |
| 7 | 2 | Type B | 0 | 4 | 4 |
|   | 3 | Type B | 0 | 6 | 4 |
| 8 | 2, 3 | Type B | 0 | 5 | 7 |
| 9 | 2, 3 | Type B | 0 | 5 | 2 |
| 10 | 2, 3 | Type B | 0 | 9 | 2 |
| 11 | 2, 3 | Type B | 0 | 12 | 2 |
| 12 | 2, 3 | Type A | 0 | 1 | 13 |
| 13 | 2, 3 | Type A | 0 | 1 | 6 |
| 14 | 2, 3 | Type A | 0 | 2 | 4 |
| 15 | 2, 3 | Type B | 0 | 4 | 7 |
| 16 | 2, 3 | Type B | 0 | 8 | 4 |

The various embodiments described above may advantageously enable the time domain resource allocation table for PDSCH carrying messages before or after RRC connection to be indicated to a wireless device. This may advantageously permit different time domain resource allocation tables to be defined, which may advantageously support flexibility and different configurations for PDSCHs carrying messages other than RMSI.

Figure 4:
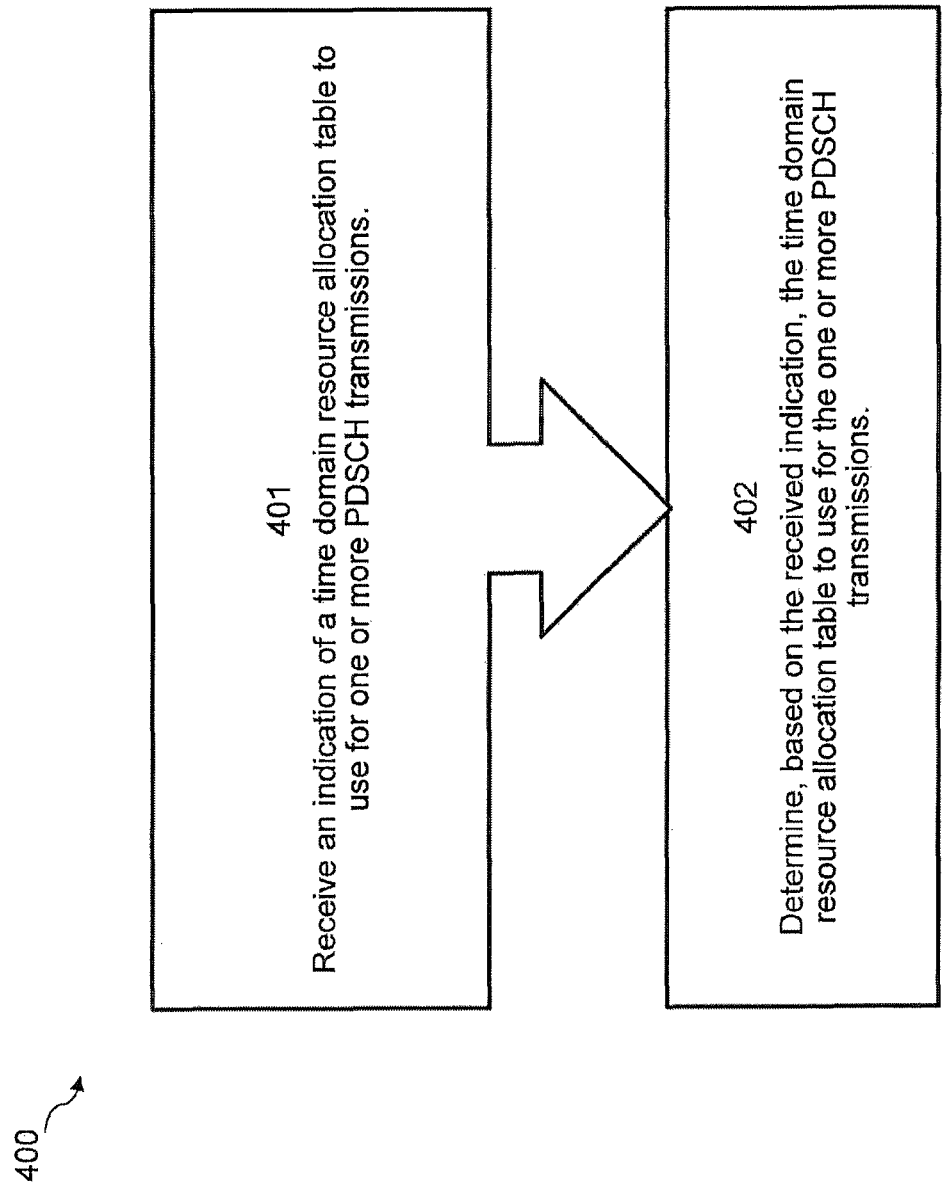
FIG. 4 is a flowchart of a method in a UE, in accordance with certain embodiments.

FIG. 4 is a flowchart of a method 400 in a wireless device (e.g., a UE), in accordance with certain embodiments. Method 400 begins at step 401, where the wireless device receives an indication of a time domain resource allocation table to use for one or more PDSCH transmissions. In certain embodiments, the wireless device may not be in an RRC connected mode. In certain embodiments, the indication of the time domain resource allocation table to use for one or more PDSCH transmissions may be received before the wireless device establishes an RRC connection.

In certain embodiments, the one or more PDSCH transmissions may comprise one or more of: RMSI; OSI, a paging message; a random access message 2; and a random access message 4.

In certain embodiments, the received indication may be included in a SIB. In certain embodiments, the SIB may be a SIB1. In certain embodiments, the received indication may comprise a PDSCH time resource allocation parameter. In certain embodiments, the received indication may comprise one or more bits.

In certain embodiments, the received indication may comprise a CORESET configuration.

At step 402, the wireless device determines, based on the received indication, the time domain resource allocation table to use for the one or more PDSCH transmissions. In certain embodiments, the method may further comprise determining a time resource allocation for the one or more PDSCH transmissions using the determined time domain resource allocation table. In certain embodiments, the time domain resource allocation table to use for the one or more PDSCH transmissions may comprise one or more of: a row index; a DMRS position; a PDSCH mapping type; a slot level offset; a starting OFDM symbol in a slot; and a number of OFDM symbols allocated for the one or more PDSCH transmissions.

In certain embodiments, the time domain resource allocation table to use for the one or more PDSCH transmissions may be configured in RMSI, and the method may further comprise determining to use the time domain resource allocation table configured in RMSI when the CORESET configuration is configured in RMSI. In certain embodiments, the time domain resource allocation table to use for the one or more PDSCH transmissions may be a time domain resource allocation table for RMSI, and the method may further comprise determining to use the time domain resource allocation table for RMSI when the CORESET configuration is configured in PBCH.

In certain embodiments, the time domain resource allocation table to use for the one or more PDSCH transmissions may be a default time domain resource allocation table defined for all PDSCH transmissions before RRC connection.

In certain embodiments, the time domain resource allocation table to use for the one or more PDSCH transmissions may be one of a plurality of time domain resource allocation tables. In certain embodiments, the plurality of time domain resource allocation tables may comprise a plurality of different default time domain resource allocation tables defined for PDSCH transmissions before RRC connection. In certain embodiments, a first time domain resource allocation table of the plurality of time domain resource allocation tables may comprise a default time domain resource allocation table configured for PDSCH carrying RMSI, and a second time domain resource allocation table of the plurality of time domain resource allocation tables may comprise a default time domain resource allocation table configured for PDSCH carrying messages other than RMSI.

Figure 5:
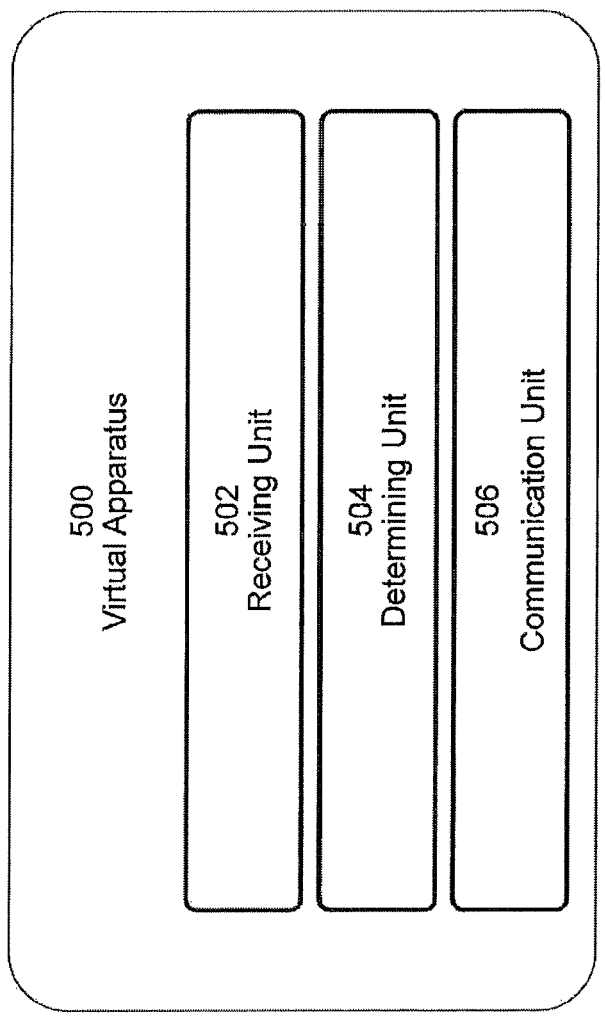
FIG. 5 is a schematic block diagram of a virtualization apparatus, in accordance with certain embodiments.

FIG. 5 is a schematic block diagram of a virtualization apparatus, in accordance with certain embodiments. More particularly, FIG. 5 illustrates a schematic block diagram of an apparatus 500 in a wireless network (for example, the wireless network shown in FIG. 3). The apparatus may be implemented in a wireless device (e.g., wireless device 110 shown in FIG. 3). Apparatus 500 is operable to carry out the example method described with reference to FIG. 4 above and possibly any other processes or methods disclosed herein. It is also to be understood that the method of FIG. 4 is not necessarily carried out solely by apparatus 500. At least some operations of the method can be performed by one or more other entities.

Virtual Apparatus 500 may comprise processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory includes program instructions for executing one or more telecommunications and/or data communications protocols as well as instructions for carrying out one or more of the techniques described herein, in several embodiments. In some implementations, the processing circuitry may be used to cause receiving unit 502, determining unit 504, communication unit 506, and any other suitable units of apparatus 500 to perform corresponding functions according one or more embodiments of the present disclosure.

In certain embodiments, apparatus 500 may be a wireless device (e.g., a UE). As illustrated in FIG. 5, apparatus 500 includes receiving unit 502, determining unit 504, and communication unit 506. Receiving unit 502 may be configured to perform the receiving functions of apparatus 500. For example, receiving unit 502 may be configured to receive an indication of a time domain resource allocation table to use for one or more PDSCH transmissions (e.g., one or more of RMSI, OSI, a paging message, a random access message 2, and a random access message 4 transmissions). In certain embodiments, receiving unit 502 may be configured to receive the indication of a time domain resource allocation table to use for the one or more PDSCH transmissions before establishing an RRC connection. In certain embodiments, receiving unit 502 may be configured to receive the indication of the time domain resource allocation to use for the one or more PDSCH transmissions in a SIB (e.g., SIB1) or as a CORESET configuration.

Receiving unit 502 may receive any suitable information (e.g., from a wireless device or another network node). Receiving unit 502 may include a receiver and/or a transceiver, such as RF transceiver circuitry 122 described above in relation to FIG. 3. Receiving unit 502 may include circuitry configured to receive messages and/or signals (wireless or wired). In particular embodiments, receiving unit 502 may communicate received messages and/or signals to determining unit 504 and/or any other suitable unit of apparatus 500. The functions of receiving unit 502 may, in certain embodiments, be performed in one or more distinct units.

Determining unit 504 may perform the processing functions of apparatus 500. For example, determining unit 504 may be configured to determine, based on the received indication, the time domain resource allocation table to use for the one or more PDSCH transmissions. For instance, in certain embodiments, determining unit 504 may be configured to identify, based on the received information, a particular time domain allocation table to use for determining time resource allocation. As another example, in certain embodiments determining unit 504 may be configured to determine a time resource allocation for the one or more PDSCH transmissions using the determined time domain resource allocation table. As still another example, in certain embodiments the time domain resource allocation table to use for the one or more PDSCH transmissions may be configured in RMSI, and determining unit 504 may be configured to determine to use the time domain resource allocation table configured in RMSI when the CORESET configuration is configured in RMSI. As yet another example, in certain embodiments the time domain resource allocation table to use for the one or more PDSCH transmissions may be a time domain resource allocation table for RMSI, and determining unit 504 may be configured to determine to use the time domain resource allocation table for RMSI when the CORESET configuration is configured in PBCH.

Determining unit 504 may include or be included in one or more processors, such as processing circuitry 120 described above in relation to FIG. 3. Determining unit 504 may include analog and/or digital circuitry configured to perform any of the functions of determining unit 504 and/or processing circuitry 120 described above. The functions of determining unit 504 may, in certain embodiments, be performed in one or more distinct units.

Communication unit 506 may be configured to perform the transmission functions of apparatus 500. Communication unit 506 may transmit messages (e.g., to a wireless device and/or another network node). Communication unit 506 may include a transmitter and/or a transceiver, such as RF transceiver circuitry 122 described above in relation to FIG. 3. Communication unit 506 may include circuitry configured to transmit messages and/or signals (e.g., through wireless or wired means). In particular embodiments, communication unit 506 may receive messages and/or signals for transmission from determining unit 504 or any other unit of apparatus. 500. The functions of communication unit 504 may, in certain embodiments, be performed in one or more distinct units.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

Figure 6:
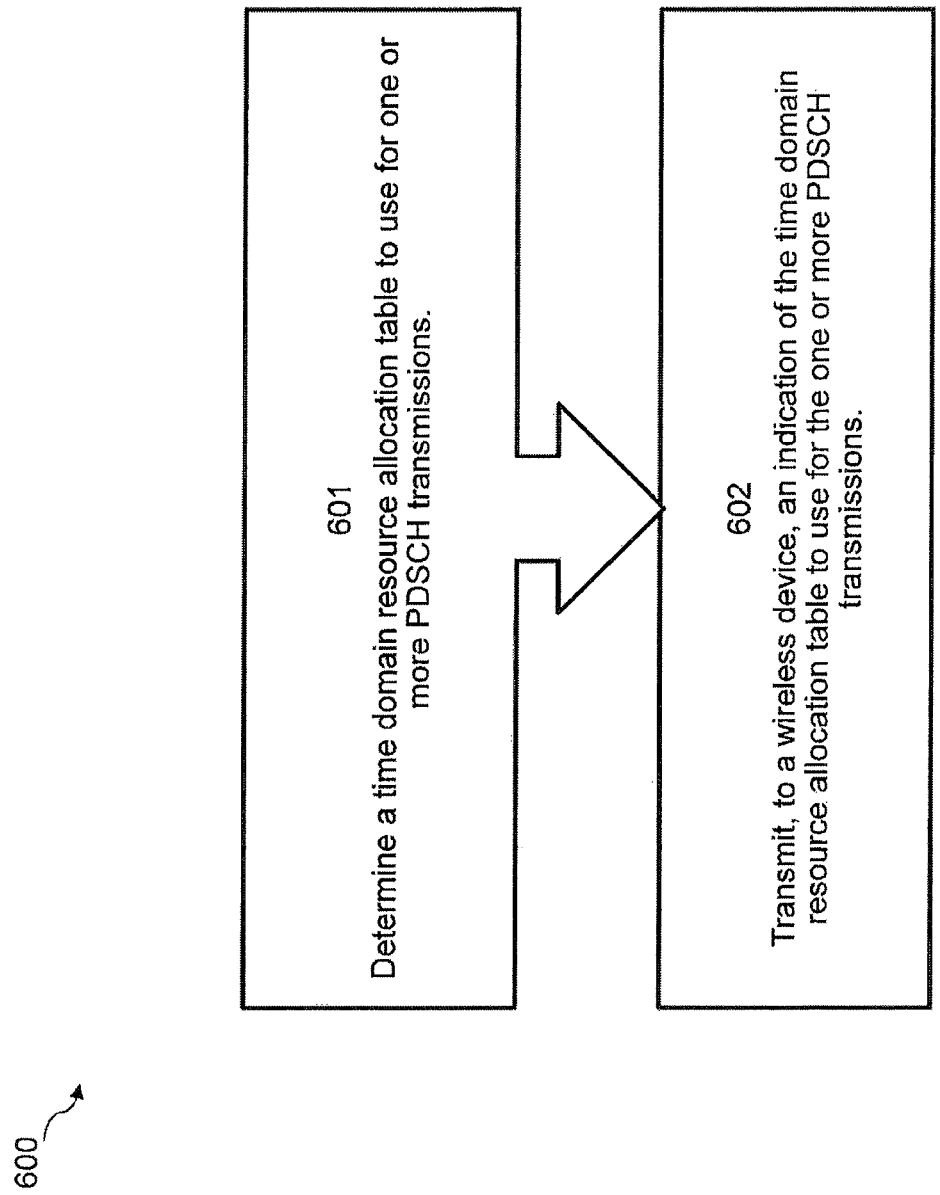
FIG. 6 is a flowchart of a method in a network node, in accordance with certain embodiments.

FIG. 6 is a flowchart of a method 600 in a network node, in accordance with certain embodiments. Method 600 begins at step 601, where the network node determines a time domain resource allocation table to use for one or more PDSCH transmissions. In certain embodiments, the one or more PDSCH transmissions may comprise one or more of: RMSI; OSI; a paging message; a random access message 2; and a random access message 4.

In certain embodiments, the time domain resource allocation table to use for the one or more PDSCH transmissions may be a default time domain resource allocation table defined for all PDSCH transmissions before RRC connection.

In certain embodiments, the time domain resource allocation table to use for the one or more PDSCH transmissions may be one of a plurality of time domain resource allocation tables. In certain embodiments, the plurality of time domain resource allocation tables may comprise a plurality of different default time domain resource allocation tables defined for PDSCH transmissions before RRC connection. In certain embodiments, a first time domain resource allocation table of the plurality of time domain resource allocation tables may comprise a default time domain resource allocation table configured for PDSCH carrying RMSI, and a second time domain resource allocation table of the plurality of time domain resource allocation tables may comprise a default time domain resource allocation table configured for PDSCH carrying messages other than RMSI.

In certain embodiments, the time domain resource allocation table to use for the one or more PDSCH transmissions may comprise one or more of: a row index; a demodulation reference signal position; a PDSCH mapping type; a slot level offset; a starting OFDM symbol in a slot; and a number of OFDM symbols allocated for the one or more PDSCH transmissions.

In certain embodiments, the method may further comprise determining a time resource allocation for the one or more PDSCH transmissions.

At step 602, the network node transmits, to a wireless device (e.g., a UE), an indication of the time domain resource allocation table to use for the one or more PDSCH transmissions. In certain embodiments, the wireless device may not be in a RRC connected mode. In certain embodiments, the indication of the time domain resource allocation table to use for the one or more PDSCH transmissions may be transmitted before the wireless device establishes an RRC connection. In certain embodiments, the indication of the time domain resource allocation table to use for the one or more PDSCH transmissions may enable the wireless device to determine and/or identify a particular time domain allocation table to use for determining a time resource allocation for the wireless device.

In certain embodiments, the indication may be included in a SIB. In certain embodiments, the SIB may be a SIB1. In certain embodiments, the indication may comprise a PDSCH time resource allocation parameter. In certain embodiments, the indication may comprise one or more bits.

In certain embodiments, the indication may comprise a CORESET configuration. In certain embodiments, the time domain resource allocation table to use for the one or more PDSCH transmissions may be configured in RMSI, and the indication may instruct the UE to use the time domain resource allocation table configured in RMSI when the CORESET configuration is configured in RMSI. In certain embodiments, the time domain resource allocation table to use for the one or more PDSCH transmissions may be a time domain resource allocation table for RMSI, and the indication may instruct the UE to use the time domain resource allocation table for RMSI when the CORESET configuration is configured in PBCH.

Figure 7:
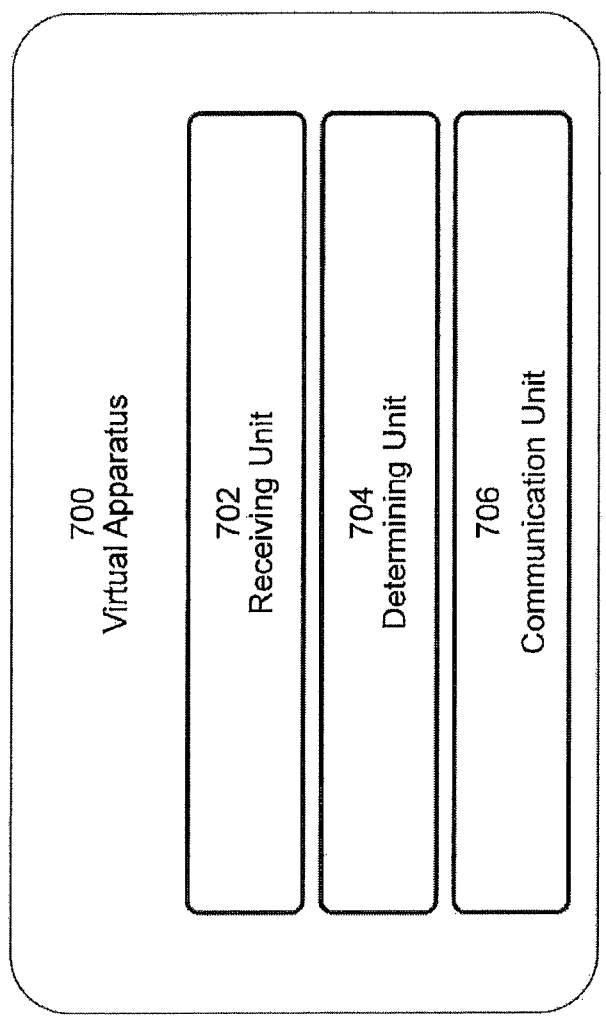
FIG. 7 is a schematic block diagram of a virtualization apparatus, in accordance with certain embodiments.

FIG. 7 is a schematic block diagram of a virtualization apparatus, in accordance with certain embodiments. More particularly, FIG. 7 illustrates a schematic block diagram of an apparatus 700 in a wireless network (for example, the wireless network shown in FIG. 3). The apparatus may be implemented in a network node (e.g., network node 160 shown in FIG. 3). Apparatus 700 is operable to carry out the example method described with reference to FIG. 6 above and possibly any other processes or methods disclosed herein. It is also to be understood that the method of FIG. 6 is not necessarily carried out solely by apparatus 700. At least some operations of the method can be performed by one or more other entities.

Virtual Apparatus 700 may comprise processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory includes program instructions for executing one or more telecommunications and/or data communications protocols as well as instructions for carrying out one or more of the techniques described herein, in several embodiments. In some implementations, the processing circuitry may be used to cause receiving unit 702, determining unit 704, communication unit 706, and any other suitable units of apparatus 700 to perform corresponding functions according one or more embodiments of the present disclosure.

In certain embodiments, apparatus 700 may be an eNB or a gNB. As illustrated in FIG. 7, apparatus 700 includes receiving unit 702, determining unit 704, and communication unit 706. Receiving unit 702 may be configured to perform the receiving functions of apparatus 700. Receiving unit 702 may receive any suitable information (e.g., from a wireless device or another network node). Receiving unit 702 may include a receiver and/or a transceiver, such as RE transceiver circuitry 172 described above in relation to FIG. 3. Receiving unit 702 may include circuitry configured to receive messages and/or signals (wireless or wired). In particular embodiments, receiving unit 702 may communicate received messages and/or signals to determining unit 704 and/or any other suitable unit of apparatus 700. The functions of receiving unit 702 may, in certain embodiments, be performed in one or more distinct units.

Determining unit 704 may perform the processing functions of apparatus 700. For example, determining unit 704 may be configured to determine a time domain resource allocation table to use for one or more PDSCH transmissions (e.g., one or more of RMSI, OSI, a paging message, a random access message 2, and a random access message 4 transmissions). As another example, determining unit 704 may be configured to determine a time resource allocation for the one or more PDSCH transmissions.

Determining unit 704 may include or be included in one or more processors, such as processing circuitry 170 described above in relation to FIG. 3. Determining unit 704 may include analog and/or digital circuitry configured to perform any of the functions of determining unit 704 and/or processing circuitry 170 described above. The functions of determining unit 704 may, in certain embodiments, be performed in one or more distinct units.

Communication unit 706 may be configured to perform the transmission functions of apparatus 700. For example, communication unit 706 may be configured to transmit, to a wireless device (e.g., a UE), an indication of the time domain resource allocation table to use for the one or more PDSCH transmissions. In certain embodiments, communication unit 706 may be configured to transmit the indication of the time domain resource allocation to use for the one or more PSCH transmissions before the wireless device establishes an RRC connection. In certain embodiments, communication unit 706 may be configured to transmit the indication of the time domain resource allocation table to use for the one or more PDSCH transmissions in a SIB (e.g., SIB1). In certain embodiments, communication unit 706 may be configured to transmit the indication of the time domain resource allocation table to use for the one or more PDSCH transmissions as a CORESET configuration.

As another example, communication unit 706 may be configured to transmit one or more PDSCH transmissions (e.g., one or more of RMSI, OSI, a paging message, a random access message 2, and a random access message 4 transmissions)

Communication unit 706 may transmit messages (e.g., to a wireless device and/or another network node). Communication unit 1006 may include a transmitter and/or a transceiver, such as RF transceiver circuitry 172 described above in relation to FIG. 3 Communication unit 706 may include circuitry configured to transmit messages and/or signals (e.g., through wireless or wired means). In particular embodiments, communication unit 706 may receive messages and/or signals for transmission from determining unit 704 or any other unit of apparatus 700. The functions of communication unit 704 may, in certain embodiments, be performed in one or more distinct units.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

Figure 8:
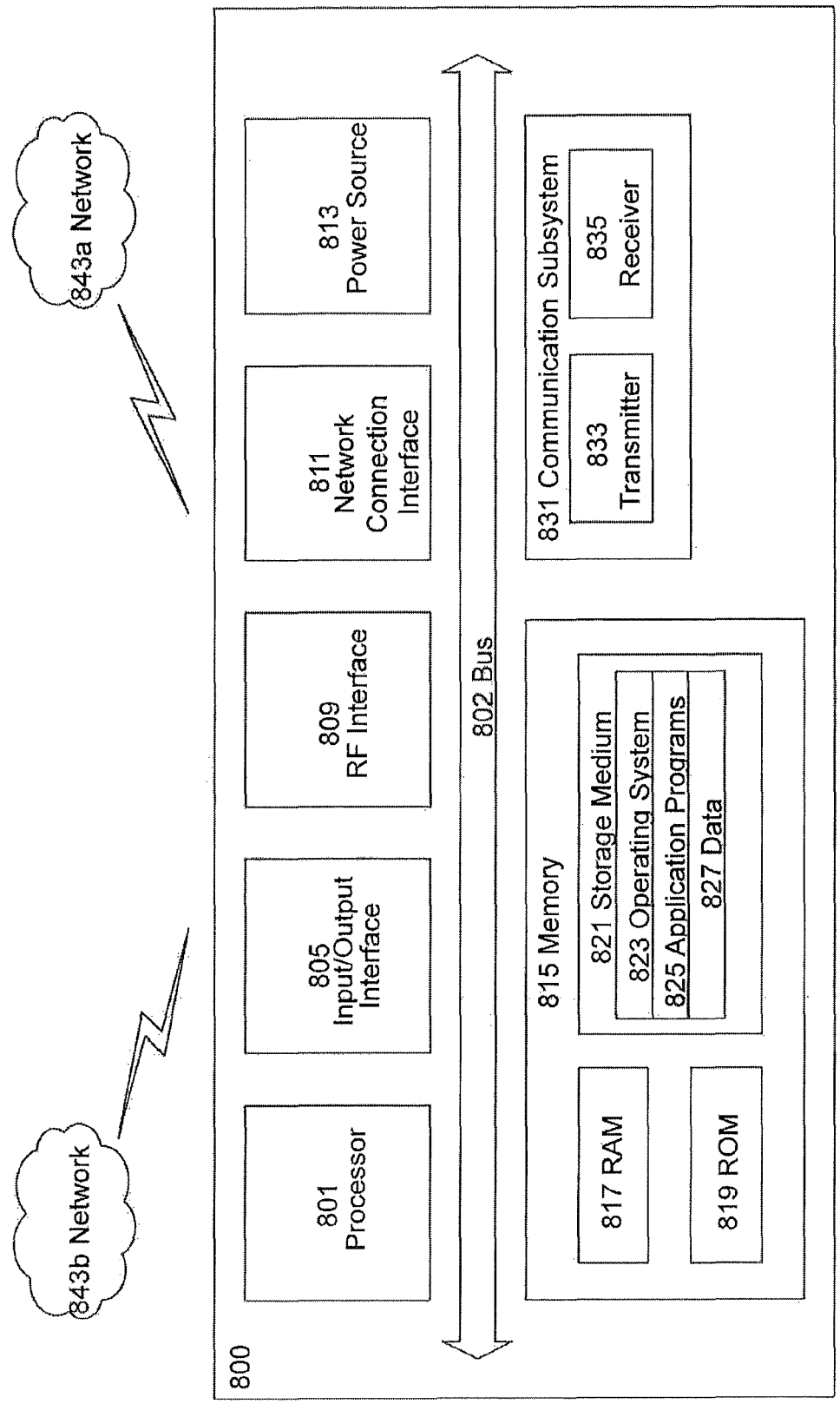
FIG. 8 illustrates one embodiment of a UE, in accordance with certain embodiments.

FIG. 8 illustrates one embodiment of a UE, in accordance with certain embodiments. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE 800 may be any UE identified by the 3$^{rd}$ Generation Partnership Project (3GPP), including a NB-IoT UE, a machine type communication (MTC) UE, and/or an enhanced MTC (eMTC) UE. UE 800, as illustrated in FIG. 8, is one example of a wireless device configured for communication in accordance with one or more communication standards promulgated by the 3$^{rd}$ Generation Partnership Project (3GPP), such as 3GPP's GSM, UMTS, LTE, and/or 5G standards. As mentioned previously, the term wireless device and UE may be used interchangeable. Accordingly, although FIG. 8 is a UE, the components discussed herein are equally applicable to a wireless device, and vice-versa.

In FIG. 8, UE 800 includes processing circuitry 801 that is operatively coupled to input/output interface 805, radio frequency (RF) interface 809, network connection interface 811, memory 815 including random access memory (RAM) 817, read-only memory (ROM) 819, and storage medium 821 or the like, communication subsystem 831, power source 833, and/or any other component, or any combination thereof. Storage medium 821 includes operating system 823, application program 825, and data 827. In other embodiments, storage medium 821 may include other similar types of information. Certain UEs may utilize all of the components shown in FIG. 8, or only a subset of the components. The level of integration between the components may vary from one UE to another UE. Further, certain UEs may contain multiple instances of a component, such as multiple processors, memories, transceivers, transmitters, receivers, etc.

In FIG. 8, processing circuitry 801 may be configured to process computer instructions and data. Processing circuitry 801 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 801 may include two central processing units (CPUs). Data may be information in a form suitable for use by a computer.

In the depicted embodiment, input/output interface 805 may be configured to provide a communication interface to an input device, output device, or input and output device. UE 800 may be configured to use an output device via input/output interface 805. An output device may use the same type of interface port as an input device. For example, a USB port may be used to provide input to and output from UE 800. The output device may be a speaker, a sound card, a video card, a display, a monitor, a printer, an actuator, an emitter, a smartcard, another output device, or any combination thereof. UE 800 may be configured to use an input device via input/output interface 805 to allow a user to capture information into UE 800. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 8, RF interface 809 may be configured to provide a communication interface to RF components such as a transmitter, a receiver, and an antenna. Network connection interface 811 may be configured to provide a communication interface to network 843*a*. Network 843*a* may encompass wired and/or wireless networks such as a local-area network (LAN), a wide-area network (WAN), a computer network, a wireless network, a telecommunications network, another like network or any combination thereof. For example, network 843*a* may comprise a Wi-Fi network. Network connection interface 811 may be configured to include a receiver and a transmitter interface used to communicate with one or more other devices over a communication network according to one or more communication protocols, such as Ethernet, TCP/IP, SONET, ATM, or the like. Network connection interface 811 may implement receiver and transmitter functionality appropriate to the communication network links (e.g., optical, electrical, and the like). The transmitter and receiver functions may share circuit components, software or firmware, or alternatively may be implemented separately.

RAM 817 may be configured to interface via bus 802 to processing circuitry 801 to provide storage or caching of data or computer instructions during the execution of software programs such as the operating system, application programs, and device drivers. ROM 819 may be configured to provide computer instructions or data to processing circuitry 801. For example, ROM 819 may be configured to store invariant low-level system code or data for basic system functions such as basic input and output (I/O), startup, or reception of keystrokes from a keyboard that are stored in a non-volatile memory. Storage medium 821 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium 821 may be configured to include operating system 823, application program 825 such as a web browser application, a widget or gadget engine or another application, and data file 827. Storage medium 821 may store, for use by UE 800, any of a variety of various operating systems or combinations of operating systems.

Storage medium 821 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 821 may allow UE 800 to access computer-executable instructions, application programs or the like, stored on transitory or non-transitory memory media, to off-load data, or to upload data. An article of manufacture, such as one utilizing a communication system may be tangibly embodied in storage medium 821, which may comprise a device readable medium.

In FIG. 8, processing circuitry 801 may be configured to communicate with network 843b using communication subsystem 831. Network 843a and network 843b may be the same network or networks or different network or networks. Communication subsystem 831 may be configured to include one or more transceivers used to communicate with network 843b. For example, communication subsystem 831 may be configured to include one or more transceivers used to communicate with one or more remote transceivers of another device capable of wireless, communication such as another wireless device, UE, or base station of a radio access network (RAN) according to one or more communication protocols, such as IEEE 802.11, CDMA, WCDMA, GSM, LTE, UTRAN, WiMax, or the like. Each transceiver may include transmitter 833 and/or receiver 835 to implement transmitter or receiver functionality, respectively, appropriate to the RAN links (e.g., frequency allocations and the like). Further, transmitter 833 and receiver 835 of each transceiver may share circuit components, software or firmware, or alternatively may be implemented separately.

In the illustrated embodiment, the communication functions of communication subsystem 831 may include data communication, voice communication, multimedia communication, short-range communications such as Bluetooth, near-field communication, location-based communication such as the use of the global positioning system (GPS) to determine a location, another like communication function, or any combination thereof. For example, communication subsystem 831 may include cellular communication, Wi-Fi communication, Bluetooth communication, and GPS communication. Network 843b may encompass wired and/or wireless networks such as a local-area network (LAN), a wide-area network (WAN), a computer network, a wireless network, a telecommunications network, another like network or any combination thereof. For example, network 843b may be a cellular network, a Wi-Fi network, and/or a near-field network. Power source 813 may be configured to provide alternating current (AC) or direct current (DC) power to components of UE 800.

The features, benefits and/or functions described herein may be implemented in one of the components of UE 800 or partitioned across multiple components of UE 800. Further, the features, benefits, and/or functions described herein may be implemented in any combination of hardware, software or firmware. In one example, communication subsystem 831 may be configured to include any of the components described herein. Further, processing circuitry 801 may be configured to communicate with any of such components over bus 802. In another example, any of such components may be represented by program instructions stored in memory that when executed by processing circuitry 801 perform the corresponding functions described herein. In another example, the functionality of any of such components may be partitioned between processing circuitry 801 and communication subsystem 831. In another example, the non-computationally intensive functions of any of such components may be implemented in software or firmware and the computationally intensive functions may be implemented in hardware.

Figure 9:
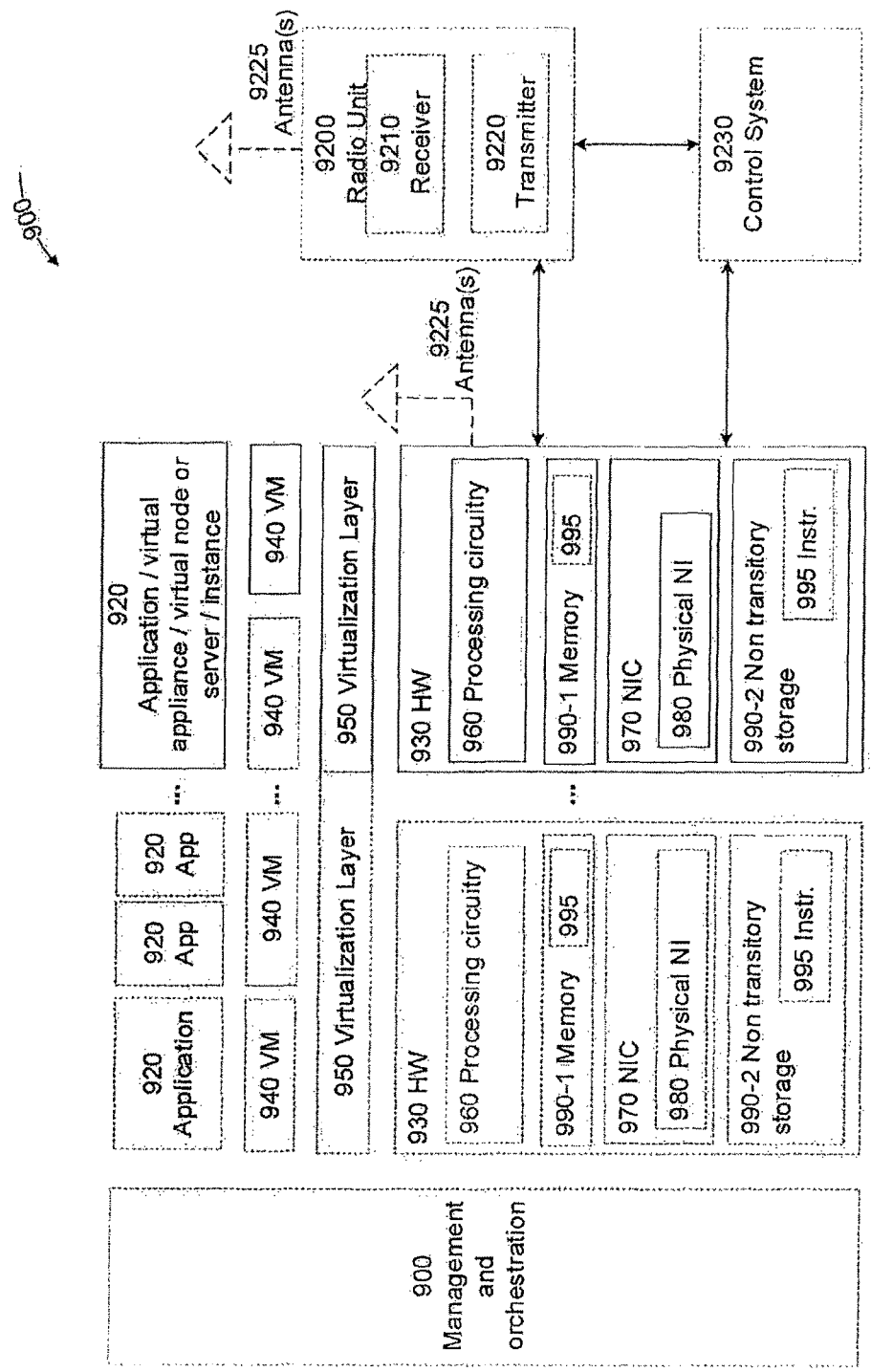
FIG. 9 is a schematic block diagram illustrating a virtualization environment, in accordance with certain embodiments.

FIG. 9 is a schematic block diagram illustrating a virtualization environment, in accordance with certain embodiments. More particularly, FIG. 9 is a schematic block diagram illustrating a virtualization environment 900 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments 900 hosted by one or more of hardware nodes 930. Further, in embodiments in which the virtual node is not a radio access node or does not require radio connectivity (e.g., a core network node), then the network node may be entirely virtualized.

The functions may be implemented by one or more applications 920 (which may alternatively be called software instances, virtual appliances, network functions, virtual nodes, virtual network functions, etc.) operative to implement some of the features, functions, and/or benefits of some of the embodiments disclosed herein. Applications 920 are run in virtualization environment 900 which provides hardware 930 comprising processing circuitry 960 and memory 990. Memory 990 contains instructions 995 executable by processing circuitry 960 whereby application 920 is operative to provide one or more of the features, benefits, and/or functions disclosed herein.

Virtualization environment 900, comprises general-purpose or special-purpose network hardware devices 930 comprising a set of one or more processors or processing circuitry 960, which may be commercial off-the-shelf (COTS) processors, dedicated Application Specific Integrated Circuits (ASICs), or any other type of processing circuitry including digital or analog hardware components or special purpose processors. Each hardware device may comprise memory 990-1 which may be non-persistent memory for temporarily storing instructions 995 or software executed by processing circuitry 960. Each hardware device may comprise one or more network interface controllers (NICs) 970, also known as network interface cards, which include physical network interface 980. Each hardware device may also include non-transitory, persistent, machine-readable storage media 990-2 having stored therein software 995 and/or instructions executable by processing circuitry 960. Software 995 may include any type of software including software for instantiating one or more virtualization layers 950 (also referred to as hypervisors), software to execute virtual machines 940 as well as software allowing it to execute functions, features and/or benefits described in relation with some embodiments described herein.

Virtual machines 940, comprise virtual processing, virtual memory, virtual networking or interface and virtual storage, and may be run by a corresponding virtualization layer 950 or hypervisor. Different embodiments of the instance of virtual appliance 920 may be implemented on one or more of virtual machines 940, and the implementations may be made in different ways.

During operation, processing circuitry 960 executes software 995 to instantiate the hypervisor or virtualization layer 950, which may sometimes be referred to as a virtual machine monitor (VMM). Virtualization layer 950 may present a virtual operating platform that appears like networking hardware to virtual machine 940.

As shown in FIG. 9, hardware 930 may be a standalone network node with generic or specific components. Hardware 930 may comprise antenna 9225 and may implement some functions via virtualization. Alternatively, hardware 930 may be part of a larger cluster of hardware (e.g. such as in a data center or customer premise equipment (CPE)) where many hardware nodes work together and are managed via management and orchestration (MANO) 9100, which, among others, oversees lifecycle management of applications 920.

Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, virtual machine 940 may be a software implementation of a physical machine that runs programs as if they were executing on a physical, non-virtualized machine. Each of virtual machines 940, and that part of hardware 930 that executes that virtual machine, be it hardware dedicated to that virtual machine and/or hardware shared by that virtual machine with others of the virtual machines 940, forms a separate virtual network elements (VNE).

Still in the context of NFV, Virtual Network Function (VNF) is responsible for handling specific network functions that run in one or more virtual machines 940 on top of hardware networking infrastructure 930 and corresponds to application 920 in FIG. 9.

In some embodiments, one or more radio units 9200 that each include one or more transmitters 9220 and one or more receivers 9210 may be coupled to one or more antennas 9225. Radio units 9200 may communicate directly with hardware nodes 930 via one or more appropriate network interfaces and may be used in combination with the virtual components to provide a virtual node with radio capabilities, such as a radio access node or a base station.

In some embodiments, some signalling can be effected with the use of control system 9230 which may alternatively be used for communication between the hardware nodes 930 and radio units 9200.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

Modifications, additions, or omissions may be made to the systems and apparatuses described herein without departing from the scope of the disclosure. The components of the systems and apparatuses may be integrated or separated. Moreover, the operations of the systems and apparatuses may be performed by more, fewer, or other components. Additionally, operations of the systems and apparatuses may be performed using any suitable logic comprising software, hardware, and/or other logic. As used in this document, "each" refers to each member of a set or each member of a subset of a set.

Modifications, additions, or omissions may be made to the methods described herein without departing from the scope of the disclosure. The methods may include more, fewer, or other steps. Additionally, steps may be performed in any suitable order.

Although this disclosure has been described in terms of certain embodiments, alterations and permutations of the embodiments will be apparent to those skilled in the art. Accordingly, the above description of the embodiments does not constrain this disclosure. Other changes, substitutions, and alterations are possible without departing from the spirit and scope of this disclosure, as defined by the following claims.

At least some of the following abbreviations may be used in this disclosure. If there is an inconsistency between abbreviations, preference should be given to how it is used above. If listed multiple times below, the first listing should be preferred over any subsequent listing(s).

1×RTT CDMA2000 1× Radio Transmission Technology
3GPP 3rd Generation Partnership Project
5G 5th Generation
ABS Almost Blank Subframe
ARQ Automatic Repeat Request
AWGN Additive White Gaussian Noise
BCCH Broadcast Control Channel
BCH Broadcast Channel
CA Carrier Aggregation
CC Carrier Component
CCCH SDU Common Control Channel SDU
CDMA Code Division Multiplexing Access
CGI Cell Global Identifier
CIR Channel Impulse Response
CORESET Control Resource Set
CP Cyclic Prefix
CPICH Common Pilot Channel
CPICH Ec/No CPICH Received energy per chip divided by the power density in the band
CQI Channel Quality information
C-RNTI Cell RNTI
CSI Channel State Information
DCCH Dedicated Control Channel
DCI Downlink Control Information
DL Downlink
DM Demodulation
DMRS Demodulation Reference Signal
DRX Discontinuous Reception
DTX Discontinuous Transmission
DTCH Dedicated Traffic Channel
DUT Device Under Test
E-CID Enhanced Cell-ID (positioning method)
E-SMLC Evolved-Serving Mobile Location Centre
ECGI Evolved CGI
eNB E-UTRAN NodeB
ePDCCH enhanced Physical Downlink Control Channel
E-SMLC evolved Serving Mobile Location Center
E-UTRA Evolved UTRA E-UTRAN Evolved UTRAN
FDD Frequency Division Duplex
FDM Frequency Division Multiplexing
FFS For Further Study
GERAN GSM EDGE Radio Access Network
gNB Base station in NR
GNSS Global Navigation Satellite System
GSM Global System for Mobile communication
HARQ Hybrid Automatic Repeat Request
HO Handover
HSPA High Speed Packet Access
HRPD High Rate Packet Data
LOS Line of Sight
LPP LTE Positioning Protocol
LTE Long-Term Evolution
MAC Medium Access Control
MBMS Multimedia Broadcast Multicast Services
MBSFN Multimedia Broadcast multicast service Single Frequency Network
MBSFN ABS MBSFN Almost Blank Subframe
MDT Minimization of Drive Tests
MIB Master Information Block
MME Mobility Management Entity
MSC Mobile Switching Center
NPDCCH Narrowband Physical Downlink Control Channel
NR New Radio
OCNG OFDMA Channel Noise Generator
OFDM Orthogonal Frequency Division Multiplexing
OFDMA Orthogonal Frequency Division Multiple Access
OS OFDM Symbol
OSI Other System Information
OSS Operations Support System
OTDOA Observed Time Difference of Arrival
O&M Operation and Maintenance
PBCH Physical Broadcast Channel
P-CCPCH Primary Common Control Physical Channel
PCell Primary Cell
PCFICH Physical Control Format Indicator Channel
PDCCH Physical Downlink Control Channel
PDP Profile Delay Profile
PDSCH Physical Downlink Shared Channel
PGW Packet Gateway
PHICH Physical Hybrid-ARQ Indicator Channel
PLMN Public Land Mobile Network
PMI Precoder Matrix Indicator
PRACH Physical Random Access Channel
PRS Positioning Reference Signal
PSCell Primary Secondary Cell
PSS Primary Synchronization Signal
PUCCH Physical Uplink Control Channel
PUSCH Physical Uplink Shared Channel
RACH Random Access Channel
QAM Quadrature Amplitude Modulation
RAN Radio Access Network
RAR Random Access Response
RAT Radio Access Technology
RLM Radio Link Management
RMSI Remaining Minimum System Information
RNC Radio Network Controller
RNTI Radio Network Temporary Identifier
RRC Radio Resource Control
RRM Radio Resource Management
RS Reference Signal
RSCP Received Signal Code Power
RSRP Reference Symbol Received Power OR Reference Signal Received Power
RSRQ Reference Signal Received Quality OR Reference Symbol Received Quality
RSSI Received Signal Strength Indicator
RSTD Reference Signal Time Difference
RV Redundancy Version
SCH Synchronization Channel
SCell Secondary Cell
SCS Subcarrier Spacing
SDU Service Data Unit
SPI Slot Format Indicator
SFN System Frame Number
SGW Serving Gateway
SI System Information
SIB System Information Block
SIB1 System Information Block Type 1
SNR Signal to Noise Ratio
SON Self Optimized Network
SS Synchronization Signal
SSB Synchronization Signal Block OR SS/PBCH Block
SS/PBCH Synchronization Signal and PBCH (including DMRS of PBCH)
SSS Secondary Synchronization Signal
TDD Time Division Duplex
TDOA Time Difference of Arrival
TOA Time of Arrival
TSS Tertiary Synchronization Signal
TTI Transmission Time Interval
UE User Equipment
UL Uplink
UMTS Universal Mobile Telecommunication System
USIM Universal Subscriber Identity Module
UTDOA Uplink Time Difference of Arrival
UTRA Universal Terrestrial Radio Access
UTRAN Universal Terrestrial Radio Access Network
WCDMA Wide CDMA

The invention claimed is:

1. A method performed by a user equipment (UE), comprising:
receiving, at the UE, an indication of a time domain resource allocation table to use for one or more Physical Downlink Shared Channel (PDSCH) transmissions, wherein the UE is not in a Radio Resource Control (RRC) connected mode when the UE is receiving the indication; and
determining, based on the received indication, the time domain resource allocation table to use for the one or more PDSCH transmissions.

2. The method of claim 1, wherein the received indication is included in broadcasted system information.

3. The method of claim 2, wherein the broadcasted system information comprises a System Information Block Type 1 (SIB1).

4. The method of claim 1, wherein the received indication comprises a PDSCH time resource allocation parameter.

5. The method of claim 1, wherein the received indication comprises a Control Resource Set (CORESET) configuration.

6. The method of claim 1, wherein the time domain resource allocation table to use for the one or more PDSCH transmissions is one of a plurality of time domain resource allocation tables.

7. The method of claim 6, wherein the plurality of time domain resource allocation tables comprises a plurality of different default time domain resource allocation tables defined for PDSCH transmissions before RRC connection.

8. The method of claim 1, further comprising determining a time resource allocation for the one or more PDSCH transmissions using the determined time domain resource allocation table.

9. A method performed by a network node, comprising:
determining a time domain resource allocation table to use for one or more Physical Downlink Shared Channel (PDSCH) transmissions; and
transmitting, to a user equipment (UE), an indication of the time domain resource allocation table to use for the one or more PDSCH transmissions, wherein the UE is not in a Radio Resource Control (RRC) connected mode when the indication is transmitted.

10. The method of claim 9, wherein the indication is included in broadcasted system information.

11. The method of claim 10, wherein the broadcasted system information comprises a System Information Block Type 1 (SIB1).

12. The method of claim 9, wherein the indication comprises a PDSCH time resource allocation parameter.

13. The method of claim 9, wherein the indication comprises a Control Resource Set (CORESET) configuration.

14. The method of claim 9, wherein the time domain resource allocation table to use for the one or more PDSCH transmissions is one of a plurality of time domain resource allocation tables.

15. The method of claim 14, wherein the plurality of time domain resource allocation tables comprises a plurality of different default time domain resource allocation tables defined for PDSCH transmissions before RRC connection.

16. A user equipment (UE), comprising:
a receiver;
a transmitter; and
processing circuitry coupled to the receiver and the transmitter, the processing circuitry configured to:
receive, at the UE, an indication of a time domain resource allocation table to use for one or more Physical Downlink Shared Channel (PDSCH) transmissions, wherein the UE is configured to receive the indication while the UE is not in a Radio Resource Control (RRC) connected mode; and
determine, based on the received indication, the time domain resource allocation table to use for the one or more PDSCH transmissions.

17. The UE of claim 16, wherein the indication is included in broadcasted system information.

18. The UE of claim 17, wherein the broadcasted system information comprises a System Information Block Type 1 (SIB1).

19. The UE of claim 16, wherein the indication comprises a PDSCH time resource allocation parameter.

20. The UE of claim 16, wherein the indication comprises a Control Resource Set (CORESET) configuration.

21. The UE of claim 16, wherein the time domain resource allocation table to use for the one or more PDSCH transmissions is one of a plurality of time domain resource allocation tables.

22. The UE of claim 21, wherein the plurality of time domain resource allocation tables comprises a plurality of different default time domain resource allocation tables defined for PDSCH transmissions before RRC connection.

23. The UE of claim 16, wherein the processing circuitry is further configured to determine a time resource allocation for the one or more PDSCH transmissions using the determined time domain resource allocation table.

24. A network node, comprising:
a receiver;
a transmitter; and
processing circuitry coupled to the receiver and the transmitter, the processing circuitry configured to:
determine a time domain resource allocation table to use for one or more Physical Downlink Shared Channel (PDSCH) transmissions; and
transmit, to a user equipment (UE), an indication of the time domain resource allocation table to use for the one or more PDSCH transmissions, wherein the network node is configured to transmit the indication when the UE is not in a Radio Resource Control (RRC) connected mode.

25. The network node of claim 24, wherein the indication is included in broadcasted system information.

26. The network node of claim 25, wherein the broadcasted system information comprises a System Information Block Type 1 (SIB1).

27. The network node of claim 24, wherein the indication comprises a PDSCH time resource allocation parameter.

28. The network node of claim 24, wherein the indication comprises a Control Resource Set (CORESET) configuration.

29. The network node of claim 24, wherein the time domain resource allocation table to use for the one or more PDSCH transmissions is one of a plurality of time domain resource allocation tables.

30. The network node of claim 29, wherein the plurality of time domain resource allocation tables comprises a plurality of different default time domain resource allocation tables defined for PDSCH transmissions before RRC connection.

* * * * *